US009686744B2

United States Patent
He et al.

(10) Patent No.: US 9,686,744 B2
(45) Date of Patent: Jun. 20, 2017

(54) DETECTION OF FADES FOR RECEIVE DIVERSITY ENABLEMENT IN A FADING CHANNEL

(71) Applicant: QUALCOMM Incorporated, San Diego, CA (US)

(72) Inventors: Ruhua He, San Diego, CA (US); Ting Kong, San Diego, CA (US); Stanley Tsai, Frederick, CO (US); Sundararaman Kunchithapatham, Boulder, CO (US); Vidya Sagar Putta, San Diego, CA (US); Kamalakar Ganti, San Diego, CA (US); Ammar Kitabi, San Diego, CA (US); Praveen Kumar Appani, San Diego, CA (US); Ahmed Ali, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/050,232

(22) Filed: Feb. 22, 2016

(65) Prior Publication Data

US 2017/0041878 A1 Feb. 9, 2017

Related U.S. Application Data

(60) Provisional application No. 62/202,434, filed on Aug. 7, 2015.

(51) Int. Cl.
*H04B 17/00* (2015.01)
*H04W 52/02* (2009.01)
*H04B 7/08* (2006.01)

(52) U.S. Cl.
CPC ........ *H04W 52/0245* (2013.01); *H04B 7/082* (2013.01); *H04B 7/0871* (2013.01);
(Continued)

(58) Field of Classification Search
CPC ......... H04W 52/0245; H04W 52/0235; H04W 52/0238; H04B 7/082; H04B 7/0871;
(Continued)

(56) References Cited

U.S. PATENT DOCUMENTS

| 5,740,526 A | 4/1998 | Bonta et al. |
| 6,018,651 A | 1/2000 | Bruckert et al. |

(Continued)

FOREIGN PATENT DOCUMENTS

| WO | WO-0011806 A1 | 3/2000 |
| WO | WO-2014062711 A1 | 4/2014 |

OTHER PUBLICATIONS

International Search Report and Written Opinion—PCT/US2016/041651—ISA/EPO—Sep. 23, 2016.
Panajotovic A.S. et al., "Average Level Crossing Rate of Dual Selection Diversity in Correlated Rician Fading with Rayleigh Cochannel Interference", IEEE Communications Letters, USA, vol. 14, No. 7, Jul. 1, 2010 (Jul. 1, 2010), pp. 605-607, XP011316402.

*Primary Examiner* — Nhan Le
(74) *Attorney, Agent, or Firm* — Loza & Loza LLP

(57) ABSTRACT

The disclosure discloses enabling/disabling receive diversity, including determining the UE in a receive diversity enabled state; comparing a first and second receive chain filtered channel chip energy to interference density ratio to an $E_c I_0$ threshold, wherein the first and second receive chain filtered channel chip energy to interference density ratios are based on at least two power measurements obtained in the receive diversity enabled state; comparing a first receive chain measured number of $E_c/I_0$ samples below $E_c I_0\_LCR\_thrshld$ to a non-receive diversity threshold, wherein the first receive chain measured number of $E_c/I_0$ samples is based on the first receive chain filtered channel chip energy to interference density ratio; and comparing a second receive chain measured number of $E_c/I_0$ samples below $E_c I_0\_LCR\_thrshld$ to the non-receive diversity threshold, wherein the second receive chain measured number of
(Continued)

$E_c/I_0$ samples is based on the second receive chain filtered channel chip energy to interference density ratio.

20 Claims, 12 Drawing Sheets

(52) U.S. Cl.
CPC ...... *H04B 7/0877* (2013.01); *H04W 52/0235* (2013.01); *H04W 52/0238* (2013.01)

(58) Field of Classification Search
CPC .... H04B 7/0877; H04B 7/045; H04B 7/0854; H04B 7/0857; H04L 1/06; H04L 27/2647; H04L 1/0026; H04L 1/0009; H04L 1/0003; H04L 1/20
USPC ............ 455/67.13, 101, 550.1; 375/299, 347
See application file for complete search history.

(56) References Cited

U.S. PATENT DOCUMENTS

| | | |
|---|---|---|
| 6,304,214 B1 | 10/2001 | Aiken et al. |
| 7,925,230 B2 | 4/2011 | Ruckriem et al. |
| 8,654,743 B1 | 2/2014 | Li et al. |
| 2008/0095132 A1* | 4/2008 | Lindoff ............... H04B 7/0817 370/342 |
| 2009/0007185 A1 | 1/2009 | Nix et al. |
| 2010/0210235 A1 | 8/2010 | Ulupinar et al. |
| 2012/0045025 A1* | 2/2012 | Akahori ............... H04B 7/0857 375/343 |

* cited by examiner

DETECTION OF FADES FOR RECEIVE DIVERSITY ENABLEMENT IN A FADING CHANNEL

PRIORITY CLAIM

This application claims priority to and the benefit of provisional patent application No. 62/202,434, filed in the United States Patent and Trademark Office on Aug. 7, 2015, the entire content of which is incorporated herein by reference.

TECHNICAL FIELD

Aspects of the present disclosure relate generally to wireless communication systems, and more particularly, to operating a user equipment with at least two antennas to enable and disable receive diversity dynamically in a fading channel.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is a cdma 2000 system. In another example, the network is a UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP).

Generally, wireless user equipment (e.g., referred to as mobile station (MS), mobile terminal (MT), access terminal (AT), etc. in various literature) configured for the network uses a SIM card to store subscriber identity and for other security and authentication purposes. SIM stands for subscriber identity module. More recently, some UEs have multiple SIM cards such that the user of the device can engage in calls or data communication on two or more different subscriptions. In general, each subscription is specified by a set of services and an identity associated with a network (e.g., cdma2000, UMTS). These subscriptions might be on the same network or different networks. A UE with multiple SIM cards is generally referred to as a multi-SIM device. Some such multi-SIM devices utilize a radio frequency (RF) resource (e.g., modem, transceiver), which is shared for accessing multiple subscriptions. However, there are certain limitations on carrying communications concurrently or simultaneously on multiple subscriptions while sharing the same RF resource.

As the demand for mobile broadband access continues to increase, research and development continue to advance multi-SIM wireless technologies not only to meet the growing demand for mobile broadband access, but to advance and enhance the user experience with mobile communications. One such advance is the usage of receiver diversity with a single SIM or multiple SIM mobile device.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

According to various aspects of the disclosure, a method of wireless communication operable at a user equipment (UE) configured for enabling or disabling receive diversity, includes determining if the UE is in a receive diversity enabled (RxD) state at a current time interval; comparing a first receive chain filtered channel chip energy to interference density ratio to an $E_c/I_0$ threshold; comparing a second receive chain filtered channel chip energy to interference density ratio to the $E_c/I_0$ threshold, wherein the first and second receive chain filtered channel chip energy to interference density ratios are based on at least two power measurements obtained in the receive diversity enabled (RxD) state; comparing a first receive chain measured number of $E_c/I_0$ samples below $E_c/I_0$_LCR_thrshld to a non-receive diversity threshold, LCR_thrshld_toNonRxD, wherein the first receive chain measured number of $E_c/I_0$ samples is based on the first receive chain filtered channel chip energy to interference density ratio; and comparing a second receive chain measured number of $E_c/I_0$ samples below $E_c/I_0$_LCR_thrshld to the non-receive diversity threshold, LCR_thrshld_toNonRxD, wherein the second receive chain measured number of $E_c/I_0$ samples is based on the second receive chain filtered channel chip energy to interference density ratio. In some examples, the method further includes determining if either the first or the second, or both the first and the second receive chain filtered channel chip energy to interference density ratio is less than the $E_c/I_0$ threshold; or determining if either the first or the second, or both the first and the second receive chain measured number of $E_c/I_0$ samples is greater than or equal to the non-receive diversity threshold, LCR_thrshld_toNonRxD; and setting a receiver in the UE to a receive diversity enabled state in a next time interval, wherein the next time interval follows the current time interval. And, in some examples, the method further includes determining that the first and the second receive chain filtered channel chip energy to interference density ratio is greater than or equal to the $E_c/I_0$ threshold; determining that the first and the second receive chain measured number of $E_c/I_0$ samples is less than the non-receive diversity threshold, LCR_thrshld_toNonRxD; and setting a receiver in the UE to a receive diversity disabled state in a next time interval, wherein the next time interval follows the current time interval.

According to various aspects of the disclosure, a method of wireless communication operable at a user equipment (UE) configured for enabling or disabling receive diversity, includes determining if the UE is in a receive diversity enabled (RxD) state at a current time interval; comparing a receive chain filtered channel chip energy to interference density ratio to an $E_c/I_0$ threshold, wherein the receive chain filtered channel chip energy to interference density ratio is based on a power measurement obtained in the receive diversity enabled (RxD) state; and comparing a receive chain measured number of $E_c/I_0$ samples below $E_c/I_0$_LCR_thrshld to a receive diversity threshold, LCR_thrshld_toRxD, wherein the receive chain measured number of $E_c/I_0$ samples is based on the receive chain filtered channel chip energy to interference density ratio. In various examples, the method further includes determining that the receive chain filtered channel chip energy to interference density ratio is less than the $E_c/I_0$ threshold; or determining that the receive chain measured number of $E_c/I_0$ samples below $E_cI_0$_LCR_thrshld is greater than or equal to the receive diversity threshold, LCR_thrshld_toRxD; and setting a receiver in the UE to a receive diversity enabled state in a next time interval, wherein the next time interval follows the current time interval. In some examples, the method further includes determining if the receive chain filtered channel chip energy to interference density ratio is greater than or equal to the $E_cI_0$ threshold; determining if the receive chain measured number of $E_c/I_0$ samples below $E_cI_0$_LCR_thrshld is less than the receive diversity threshold, LCR_thrshld_toRxD and setting a receiver in the UE to a receive diversity disabled state in a next time interval, wherein the next time interval follows the current time interval.

According to various aspects of the disclosure, an apparatus for wireless communication operable at a user equipment (UE) configured for enabling or disabling receive diversity, includes means for determining if the UE is in a receive diversity enabled (RxD) state at a current time interval; means for comparing a first receive chain filtered channel chip energy to interference density ratio to an $E_cI_0$ threshold; means for comparing a second receive chain filtered channel chip energy to interference density ratio to the $E_cI_0$ threshold, wherein the first and second receive chain filtered channel chip energy to interference density ratios are based on at least two power measurements obtained in the receive diversity enabled (RxD) state; means for comparing a first receive chain measured number of $E_c/I_0$ samples below $E_cI_0$_LCR_thrshld to a non-receive diversity threshold, LCR_thrshld_toNonRxD, wherein the first receive chain measured number of $E_c/I_0$ samples is based on the first receive chain filtered channel chip energy to interference density ratio; and means for comparing a second receive chain measured number of $E_c/I_0$ samples below $E_cI_0$_LCR_thrshld to the non-receive diversity threshold, LCR_thrshld_toNonRxD, wherein the second receive chain measured number of $E_c/I_0$ samples is based on the second receive chain filtered channel chip energy to interference density ratio. In some examples, the apparatus further includes means for determining if either the first or the second, or both the first and the second receive chain filtered channel chip energy to interference density ratio is less than the $E_cI_0$ threshold; or determining if either the first or the second, or both the first and the second receive chain measured number of $E_c/I_0$ samples is greater than or equal to the non-receive diversity threshold, LCR_thrshld_toNonRxD; and means for setting a receiver in the UE to a receive diversity enabled state in a next time interval, wherein the next time interval follows the current time interval. In some examples, the apparatus further includes means for determining that the first and the second receive chain filtered channel chip energy to interference density ratio is greater than or equal to the $E_cI_0$ threshold; means for determining that the first and the second receive chain measured number of $E_c/I_0$ samples is less than the non-receive diversity threshold, LCR_thrshld_toNonRxD; and means for setting a receiver in the UE to a receive diversity disabled state in a next time interval, wherein the next time interval follows the current time interval.

According to various aspects of the disclosure, an apparatus for wireless communication operable at a user equipment (UE) configured for enabling or disabling receive diversity, includes means for determining if the UE is in a receive diversity enabled (RxD) state at a current time interval; means for comparing a receive chain filtered channel chip energy to interference density ratio to an $E_cI_0$ threshold, wherein the receive chain filtered channel chip energy to interference density ratio is based on a power measurement obtained in the receive diversity enabled (RxD) state; and means for comparing a receive chain measured number of $E_c/I_0$ samples below $E_cI_0$_LCR_thrshld to a receive diversity threshold, LCR_thrshld_toRxD, wherein the receive chain measured number of $E_c/I_0$ samples is based on the receive chain filtered channel chip energy to interference density ratio. In some examples, the apparatus further includes means for determining that the receive chain filtered channel chip energy to interference density ratio is less than the $E_cI_0$ threshold; or means for determining that the receive chain measured number of $E_c/I_0$ samples below $E_cI_0$_LCR_thrshld is greater than or equal to the receive diversity threshold, LCR_thrshld_toRxD; and means for setting a receiver in the UE to a receive diversity enabled state in a next time interval, wherein the next time interval follows the current time interval. In some examples, the apparatus further includes means for determining if the receive chain filtered channel chip energy to interference density ratio is greater than or equal to the $E_cI_0$ threshold; means for determining if the receive chain measured number of $E_c/I_0$ samples below $E_cI_0$_LCR_thrshld is less than the receive diversity threshold, LCR_thrshld_toRxD and means for setting a receiver in the UE to a receive diversity disabled state in a next time interval, wherein the next time interval follows the current time interval.

According to various aspects of the disclosure, an apparatus for wireless communication operable at a user equipment (UE) configured for enabling or disabling receive diversity, includes a controller configured for determining if the UE is in a receive diversity enabled (RxD) state at a current time interval; and a channel decoder configured for comparing a first receive chain filtered channel chip energy to interference density ratio to an $E_cI_0$ threshold, and for comparing a second receive chain filtered channel chip energy to interference density ratio to the $E_cI_0$ threshold, wherein the first and second receive chain filtered channel chip energy to interference density ratios are based on at least two power measurements obtained in the receive diversity enabled (RxD) state; and wherein the controller is further configured for comparing a first receive chain measured number of $E_c/I_0$ samples below $E_cI_0$_LCR_thrshld to a non-receive diversity threshold, LCR_thrshld_toNonRxD, wherein the first receive chain measured number of $E_c/I_0$ samples is based on the first receive chain filtered channel chip energy to interference density ratio, and for comparing a second receive chain measured number of $E_c/I_0$ samples below $E_cI_0$_LCR_thrshld to the non-receive diversity threshold, LCR_thrshld_toNonRxD, wherein the second receive chain measured number of $E_c/I_0$ samples is based on the second receive chain filtered channel chip energy to interference density ratio. In some example, wherein if either the first or the second, or both the first and the second receive chain filtered channel chip energy to interference density ratio is less than the $E_cI_0$ threshold; or if either the first or the second, or both the first and the second receive chain measured number of $E_c/I_0$ samples is greater than or equal to the non-receive diversity threshold, LCR_thrshld_toNonRxD, then the controller is further configured for setting a receiver in the UE to a receive diversity enabled state in a next time interval, wherein the next time interval follows the current time interval. In some examples, wherein if the first and the second receive chain filtered channel chip energy to interference density ratio is greater than or equal to the $E_cI_0$ threshold and if the first and the second receive chain measured number of $E_c/I_0$ samples is less than the non-receive diversity threshold, LCR_thrshld_toNonRxD, then the controller is further configured for setting a receiver in the UE to a receive diversity disabled state in a next time interval, wherein the next time interval follows the current time interval.

According to various aspects of the disclosure, an apparatus for wireless communication operable at a user equipment (UE) configured for enabling or disabling receive diversity, includes a controller configured for determining if the UE is in a receive diversity enabled (RxD) state at a current time interval; and a channel decoder for comparing a receive chain filtered channel chip energy to interference density ratio to an $E_c/I_0$ threshold, wherein the receive chain filtered channel chip energy to interference density ratio is based on a power measurement obtained in the receive diversity enabled (RxD) state; and wherein the controller is further configured for comparing a receive chain measured number of $E_c/I_0$ samples below $E_c I_0$_LCR_thrshld to a receive diversity threshold, LCR_thrshld_toRxD, wherein the receive chain measured number of $E_c/I_0$ samples is based on the receive chain filtered channel chip energy to interference density ratio. In some examples, if the receive chain filtered channel chip energy to interference density ratio is less than the $E_c I_0$ threshold, or if the receive chain measured number of $E_c/I_0$ samples below $E_c I_0$_LCR_thrshld is greater than or equal to the receive diversity threshold, LCR_thrshld_toRxD, then the controller is further configured for setting a receiver in the UE to a receive diversity enabled state in a next time interval, wherein the next time interval follows the current time interval. In some examples, if the receive chain filtered channel chip energy to interference density ratio is greater than or equal to the $E_c I_0$ threshold, and if the receive chain measured number of $E_c/I_0$ samples below $E_c I_0$_LCR_thrshld is less than the receive diversity threshold, LCR_thrshld_toRxD, then the controller is further configured for setting a receiver in the UE to a receive diversity disabled state in a next time interval, wherein the next time interval follows the current time interval.

According to various aspects of the disclosure, a computer-readable storage medium storing computer executable code, operable on a device including at least one processor; a memory for storing a plurality of victim bands, the memory coupled to the at least one processor; and the computer executable code includes instructions for causing the at least one processor to determine if the UE is in a receive diversity enabled (RxD) state at a current time interval; instructions for causing the at least one processor to compare a first receive chain filtered channel chip energy to interference density ratio to an $E_c I_0$ threshold; instructions for causing the at least one processor to compare a second receive chain filtered channel chip energy to interference density ratio to the $E_c I_0$ threshold, wherein the first and second receive chain filtered channel chip energy to interference density ratios are based on at least two power measurements obtained in the receive diversity enabled (RxD) state; instructions for causing the at least one processor to compare a first receive chain measured number of $E_c/I_0$ samples below $E_c I_0$_LCR_thrshld to a non-receive diversity threshold, LCR_thrshld_toNonRxD, wherein the first receive chain measured number of $E_c/I_0$ samples is based on the first receive chain filtered channel chip energy to interference density ratio; and instructions for causing the at least one processor to compare a second receive chain measured number of $E_c/I_0$ samples below $E_c I_0$_LCR_thrshld to the non-receive diversity threshold, LCR_thrshld_toNonRxD, wherein the second receive chain measured number of $E_c/I_0$ samples is based on the second receive chain filtered channel chip energy to interference density ratio.

According to various aspects of the disclosure, a computer-readable storage medium storing computer executable code, operable on a device including at least one processor; a memory for storing a plurality of victim bands, the memory coupled to the at least one processor; and the computer executable code includes instructions for causing the at least one processor to determine if the UE is in a receive diversity enabled (RxD) state at a current time interval; instructions for causing the at least one processor to compare a receive chain filtered channel chip energy to interference density ratio to an $E_c I_0$ threshold, wherein the receive chain filtered channel chip energy to interference density ratio is based on a power measurement obtained in the receive diversity enabled (RxD) state; and instructions for causing the at least one processor to compare a receive chain measured number of $E_c/I_0$ samples below $E_c I_0$_LCR_thrshld to a receive diversity threshold, LCR_thrshld_toRxD, wherein the receive chain measured number of $E_c/I_0$ samples is based on the receive chain filtered channel chip energy to interference density ratio.

These and other aspects of the present disclosure will become more fully understood upon a review of the detailed description, which follows. Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the present disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure improve demodulation performance in single SIM or multi-SIM mobile devices in a fading channel. The description set forth below in connection with the appended drawings is intended as a description of various configurations and is not intended to represent the only configurations in which the concepts described herein may be practiced. The description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

One or more aspects of the disclosure provide for a wireless user equipment (UE) configured to enable communication with two or more receive chains simultaneously using receive diversity, wherein each subscription may be in the same or in different radio access technologies (RAT). In various examples, the UE may include wireless devices, wireless receivers, mobile devices, mobile stations, mobile terminals, access terminals, etc. The UE may be a single SIM or a multi-SIM device that has one or multiple SIM applications stored on one or more SIM cards. In some aspects of the disclosure, however, the SIM applications may be stored at the UE without using any soft SIM models.

Figure 1A:
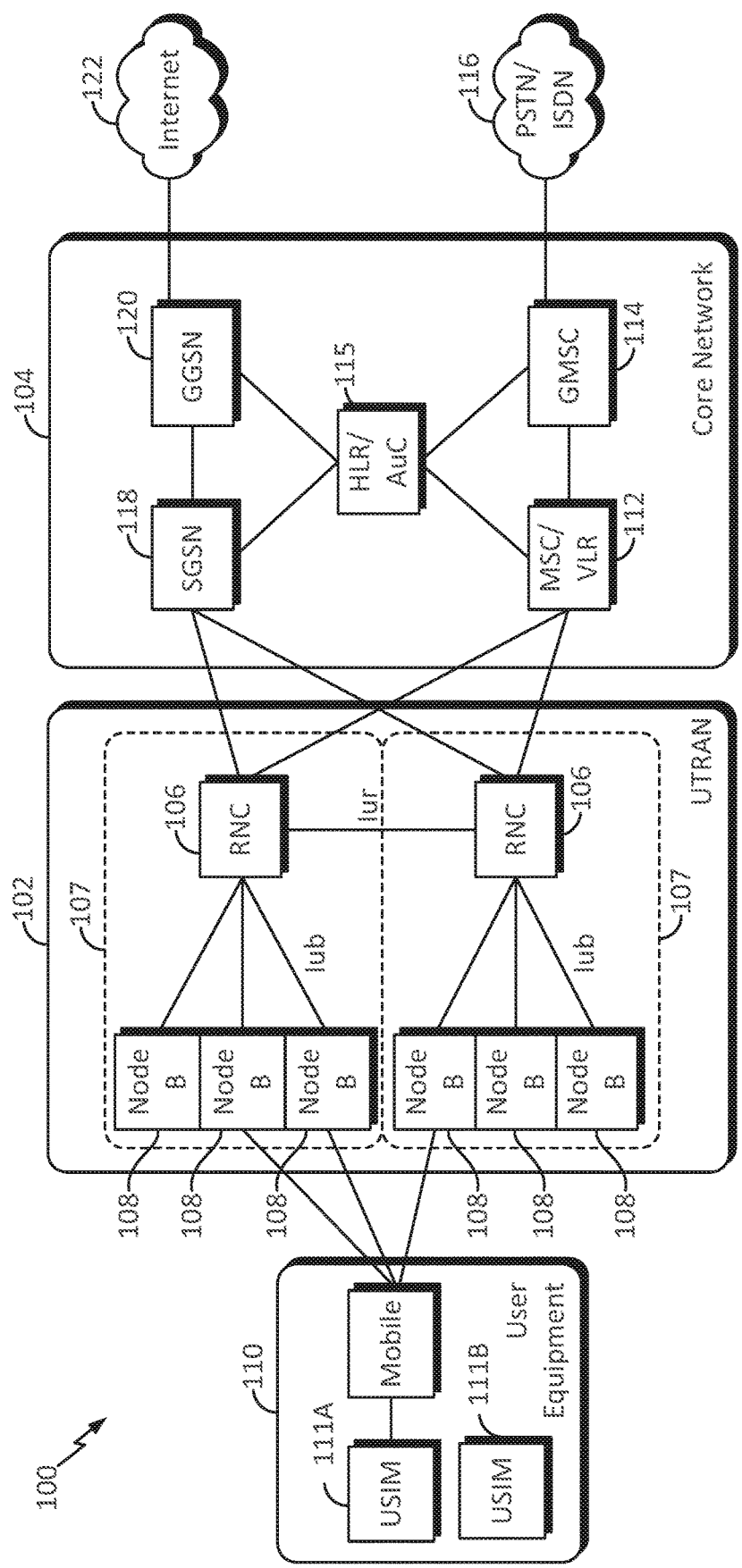
FIG. 1a is a conceptual diagram illustrating a first example of a telecommunications system according to some aspects of the present disclosure.

The various concepts presented throughout this disclosure may be implemented across a broad variety of telecommunication systems, network architectures, and communication standards. FIG. 1a is a conceptual diagram illustrating a first example of a telecommunications system according to some aspects of the present disclosure. Referring now to FIG. 1a, as an illustrative example without limitation, various aspects of the present disclosure are illustrated with reference to a Universal Mobile Telecommunications System (UMTS) network 100. A UMTS network includes three interacting domains: a core network 104, a radio access network (RAN) (e.g., the UMTS Terrestrial Radio Access Network (UTRAN) 102), and a user equipment (UE) 110. Among several options available for a UTRAN 102, in this example, the illustrated UTRAN 102 may employ a W-CDMA air interface for enabling various wireless services including telephony, video, data, messaging, broadcasts, and/or other services. The UTRAN 102 may include a plurality of Radio Network Subsystems (RNSs) such as an RNS 107, each controlled by a respective Radio Network Controller (RNC) such as an RNC 106. Here, the UTRAN 102 may include any number of RNCs 106 and RNSs 107 in addition to the illustrated RNCs 106 and RNSs 107. The RNC 106 is an apparatus responsible for, among other things, assigning, reconfiguring, and releasing radio resources within the RNS 107. The RNC 106 may be interconnected to other RNCs (not shown) in the UTRAN 102 through various types of interfaces such as a direct physical connection, a virtual network, or the like using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 108 are shown in each RNS 107; however, the RNSs 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 110 may further include a universal subscriber identity module (USIM) 111 (111A and 111B), which contains a user's subscription information to a network. For illustrative purposes, one UE 110 is shown in communication with a number of the Node Bs 108. The downlink (DL), also called the forward link, refers to the communication link from a Node B 108 to a UE 110 and the uplink (UL), also called the reverse link, refers to the communication link from a UE 110 to a Node B 108.

The core network 104 can interface with one or more access networks, such as the UTRAN 102. As shown, the core network 104 is a UMTS core network. However, as those skilled in the art will recognize, the various concepts presented throughout this disclosure may be implemented in a RAN, or other suitable access network, to provide UEs with access to types of core networks other than UMTS networks such as cdma2000 and Long Term Evolution (LTE) networks.

The illustrated UMTS core network 104 includes a circuit-switched (CS) domain and a packet-switched (PS)

domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like Home Location Register (HLR), Visitor Location Register (VLR), and Authentication Center (AuC) may be shared by both of the circuit-switched and packet-switched domains.

In the illustrated example, the core network 104 supports circuit-switched services with an MSC 112 and a GMSC 114. In some applications, the GMSC 114 may be referred to as a media gateway (MGW). One or more RNCs, such as the RNC 106, may be connected to the MSC 112. The MSC 112 is an apparatus that controls call setup, call routing, and UE mobility functions. The MSC 112 also includes a visitor location register (VLR) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The illustrated core network 104 also supports packet-switched data services with a serving GPRS support node (SGSN) 118 and a gateway GPRS support node (GGSN) 120. General Packet Radio Service (GPRS) is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

In some aspects of the disclosure, the UE 110 may include a plurality of universal integrated circuit cards (UICCs), each of which may run one or more universal subscriber identity module (USIM) applications. A USIM stores the subscriber's identity, and provides a user's subscription information to a network as well as performing other security and authentication roles. The illustrated UE 110 includes two USIMs 111A and 111B, but those of ordinary skill in the art will understand that this is illustrative in nature only, and a UE may include any suitable number of USIMs. UEs such as the UE 110 having multiple USIMs are sometimes referred to as multi-SIM devices, with one particular example with two USIMs being called Dual SIM Dual Standby (DSDS) device or dual-SIM device. A DSDS device is generally capable of being active on two networks (or subscriptions) concurrently or simultaneously in standby mode, where an RF resource (e.g., transceiver) at the UE 110 is time-shared by two subscriptions on the respective networks. In this way, connections or calls may be established on either of the networks or subscriptions with a single device.

As described above, the illustrated UE 110 is an example of a DSDS device capable of maintaining two subscriptions on the UMTS network 100 and or other networks. Within the scope of the present disclosure, similar functionality may be achieved utilizing more than one radio access technology (RAT), wherein the UE simultaneously maintains two or more subscriptions on two or more different RATs. For example, in various aspects of the disclosure, a UE may maintain one or more subscriptions on one or more of a GSM network, a UMTS network, an LTE network, a cdma2000 network, a Wi-MAX network, or any other suitable RAT. Within the present disclosure, DSDS devices, multi-SIM/multi-standby devices, or any device capable of monitoring channels on two or more subscriptions on any one or any plural number of RATs is generally referred to as a multi-standby device.

Figure 1B:
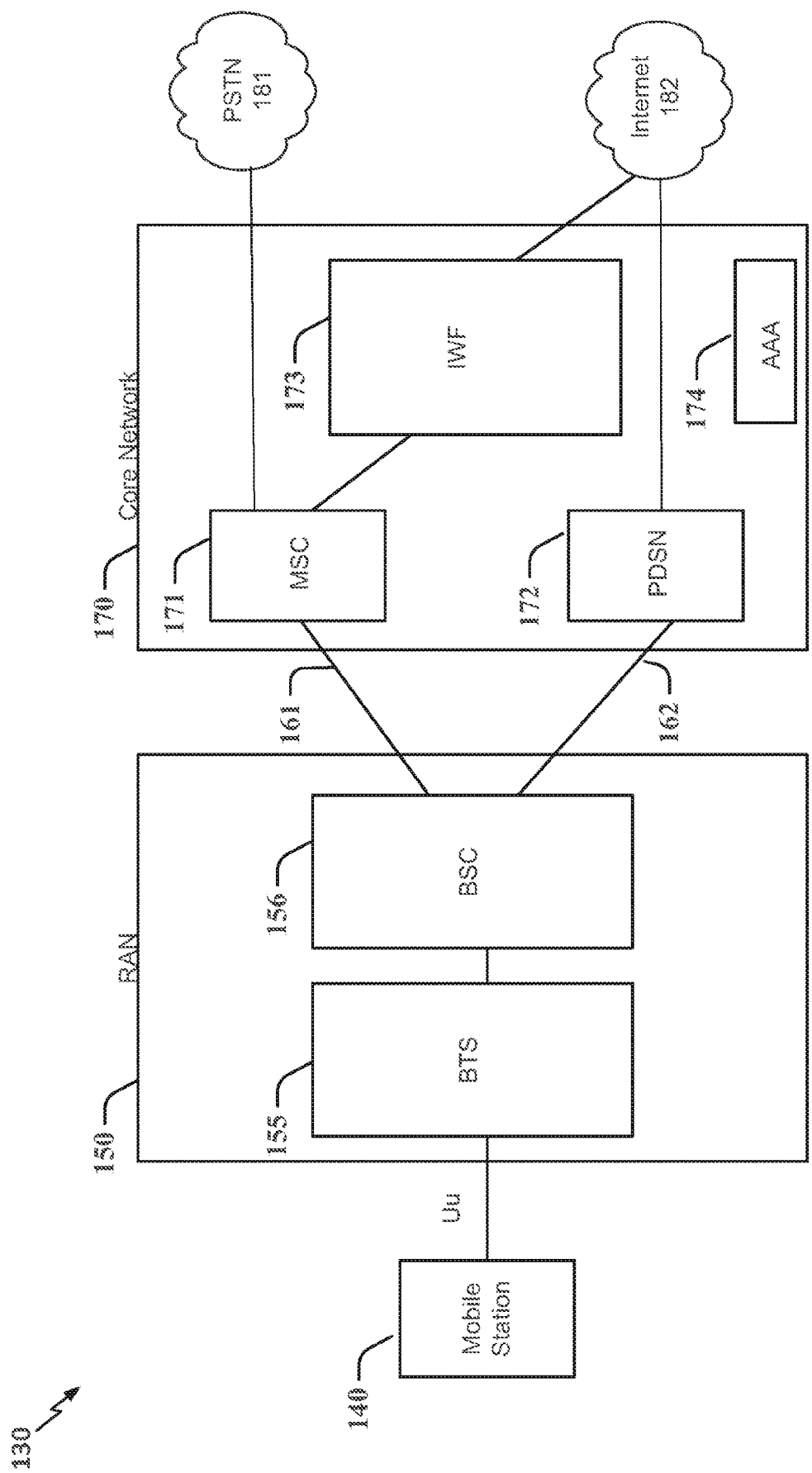
FIG. 1b is a conceptual diagram illustrating a second example of a telecommunications system in according to some aspects of the present disclosure.

FIG. 1b is a conceptual diagram illustrating a second example of a telecommunications system in according to some aspects of the present disclosure. In FIG. 1b, various aspects of the present disclosure are illustrated for a wide area network (WAN) with reference to an Evolution Data Only (EVDO) system 130 as part of the 3GPP2 protocol family. The EVDO system 130 includes three interacting domains: a core network 170, a RAN 150 and a mobile station (MS) 140. The RAN 150 may include a plurality of Base Transceiver Systems (BTS) 155, each controlled by a respective Base Station Controller (BSC) 156. The RAN 150 may include any number of BTSs 155 and BSCs 156 in addition to the illustrated BTS 155 and BSC 156. The BSC 156 may be responsible for radio resource management within the BTS 155.

The geographic region covered by the BTS 155 may be divided into a number of cells, with a radio transceiver apparatus serving each cell, also known as a base station (BS). The BTS 155 may provide radio access to the core network 170 for any number of mobile stations (MS) 140. The MS 140 is also referred to as user equipment (UE). For illustration, in FIG. 1b, one MS 140 is shown in communication with a BTS 155 over a Uu interface. The downlink (DL), also known as forward link, refers to the communication link from a BTS 155 to a MS 140. The uplink (UL), also known as reverse link, refers to the communication link from a MS 140 to a BTS 155.

The core network 170 may interface with one or more access networks, such as the RAN 150. As shown, the core network 170 is an EVDO core network. However, the various concepts presented here may be implemented by any suitable access network to provide the MS 140 with access to other core networks. In a cdma2000 system, the MS 140 may further include one or more subscriber identity modules (not shown).

The core network 170 may include a circuit switched interface 161 and a packet switched interface 162 from the RAN 150. Circuit switched services are handled by mobile switching center (MSC) 171 and packet switched services are handled by packet data serving node (PDSN) 172. The MSC 171 may connect to a public switched telephony network (PSTN) 181 or any other circuit switched network. The PDSN 172 may connect to the Internet 182 or any other packet switched network. In addition, the core network 170 may provide an inter-working function (IWF) 173 to facilitate cross-domain connectivity between MSC 171 and the Internet 182. Also, an authentication authorization and accounting (AAA) server 174 provides various security services in the core network 170.

The RAN 150 air interface may be a spread spectrum Code Division Multiple Access (CDMA) system which may use a variety of wireless access standards such as the cdma2000 family. Although various examples described herein may refer to a CDMA air interface, the underlying principles are equally applicable to any suitable air interface.

Figure 2:
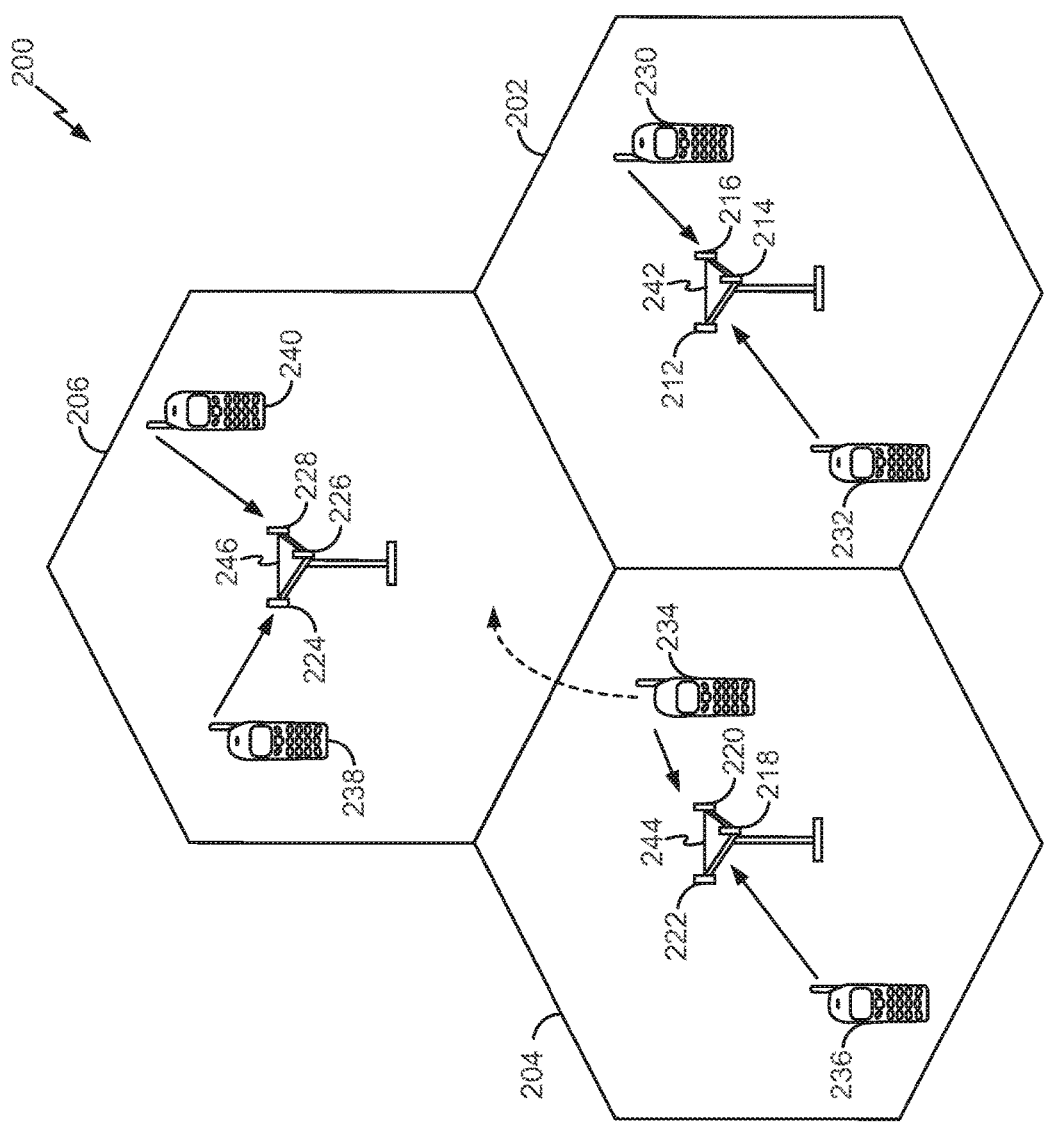
FIG. 2 is a conceptual diagram illustrating an example of an access network according to some aspects of the present disclosure.

FIG. 2 is a conceptual diagram illustrating an example of an access network according to some aspects of the present disclosure. Referring to FIG. 2, by way of example and without limitation, a simplified schematic illustration of a RAN 200 in a UTRAN architecture is illustrated. The system includes multiple cellular regions (cells), including cells 202, 204, and 206, each of which may include one or more sectors. Cells may be defined geographically (e.g., by coverage area) and/or may be defined in accordance with a frequency, scrambling code, etc. That is, the illustrated geographically-defined cells 202, 204, and 206 may each be further divided into a plurality of cells, e.g., by utilizing different scrambling codes. For example, a first cell may utilize a first scrambling code, and a second cell, while in the same geographic region and served by the same Node B 244, may be distinguished by utilizing a second scrambling code.

In a cell that is divided into sectors, the multiple sectors within a cell can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 may each correspond to a different sector. In cell 206, antenna groups 224, 226, and 228 may each correspond to a different sector.

The cells 202, 204, and 206 may include several UEs that may be in communication with one or more sectors of each cell 202, 204, or 206. For example, UEs 230 and 232 may be in communication with Node B 242, UEs 234 and 236 may be in communication with Node B 244, and UEs 238 and 240 may be in communication with Node B 246. Here, each Node B 242, 244, and 246 may be configured to provide an access point to a core network 104, 170 (see FIGS. 1a and 1b) for all the UEs 230, 232, 234, 236, 238, and 240 in the respective cells 202, 204, and 206.

During a call with a source cell, or at any other time, the UE 236 may monitor various parameters of the source cell as well as various parameters of neighboring cells. Further, depending on the quality of these parameters, the UE 236 may maintain communication with one or more of the neighboring cells. During this time, the UE 236 may maintain an Active Set, that is, a list of cells to which the UE 236 is simultaneously connected (i.e., the UTRAN cells that are currently assigning a downlink dedicated physical channel DPCH or fractional downlink dedicated physical channel F-DPCH to the UE 236 may constitute the Active Set). In some aspects of the disclosure, any of the UEs in FIG. 2 may be a single SIM device, multi-SIM device or a DSDS device supporting multiple subscriptions.

In a wireless telecommunication system, the communication protocol architecture may take on various forms depending on the particular application. For example, in a UMTS system or a 3GPP2 cdma2000 system, the signaling protocol stack is divided into a Non-Access Stratum (NAS) and an Access Stratum (AS). The NAS provides the upper layers, for signaling between the UE 110 and the core network 104 (referring to FIG. 1a) or between MS 140 and core network 170 (referring to FIG. 1b), and may include circuit switched and packet switched protocols. The AS provides the lower layers, for signaling between the UTRAN 102 and the UE 110, and may include a user plane and a control plane. Here, the user plane or data plane carries user traffic, while the control plane carries control information (i.e., signaling).

Figure 3:
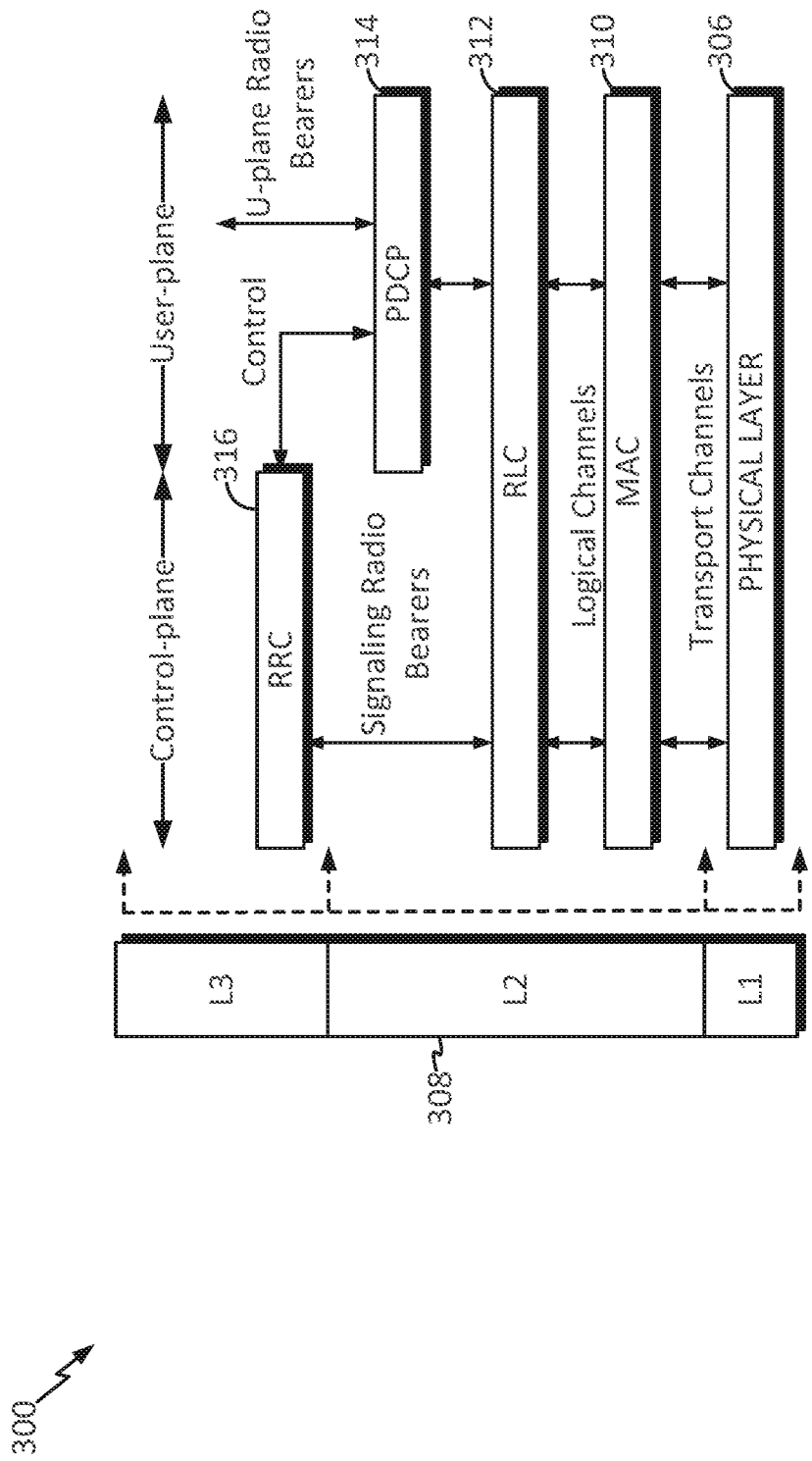
FIG. 3 is a conceptual diagram illustrating an example of a radio protocol architecture for the user and control plane according to some aspects of the present disclosure.

FIG. 3 is a conceptual diagram illustrating an example of a radio protocol architecture 300 for the user and control plane according to some aspects of the present disclosure. Turning to FIG. 3, the AS is shown with three layers: Layer 1 (L1), Layer 2 (L2), and Layer 3 (L3). Layer 1 is the lowest layer and implements various physical layer signal processing functions. Layer 1 will be referred to herein as the physical layer 306. The data link layer, called Layer 2 308, is above the physical layer 306 and is responsible for the link between the UE and Node B over the physical layer 306.

At Layer 3, the radio resource control (RRC) layer 316 handles the control plane signaling between the UE and the Node B. RRC layer 316 includes a number of functional entities for routing higher layer messages, handling broadcasting and paging functions, establishing and configuring radio bearers, etc.

In the illustrated air interface, the L2 layer 308 is split into sublayers. In the control plane, the L2 layer 308 includes two sublayers: a medium access control (MAC) sublayer 310 and a radio link control (RLC) sublayer 312. In the user plane, the L2 layer 308 additionally includes a packet data convergence protocol (PDCP) sublayer 314. Although not shown, the UE may have several upper layers above the L2 layer 308 including a network layer (e.g., IP layer) that is terminated at a PDN gateway on the network side and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between Node Bs.

The RLC sublayer 312 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations. FIG. 3 is applicable to both 3GPP and 3GPP2 wireless systems although some of the functional blocks, RRC 316, PDCP 314, RLC 312, etc. may be designated by different names.

Figure 4:
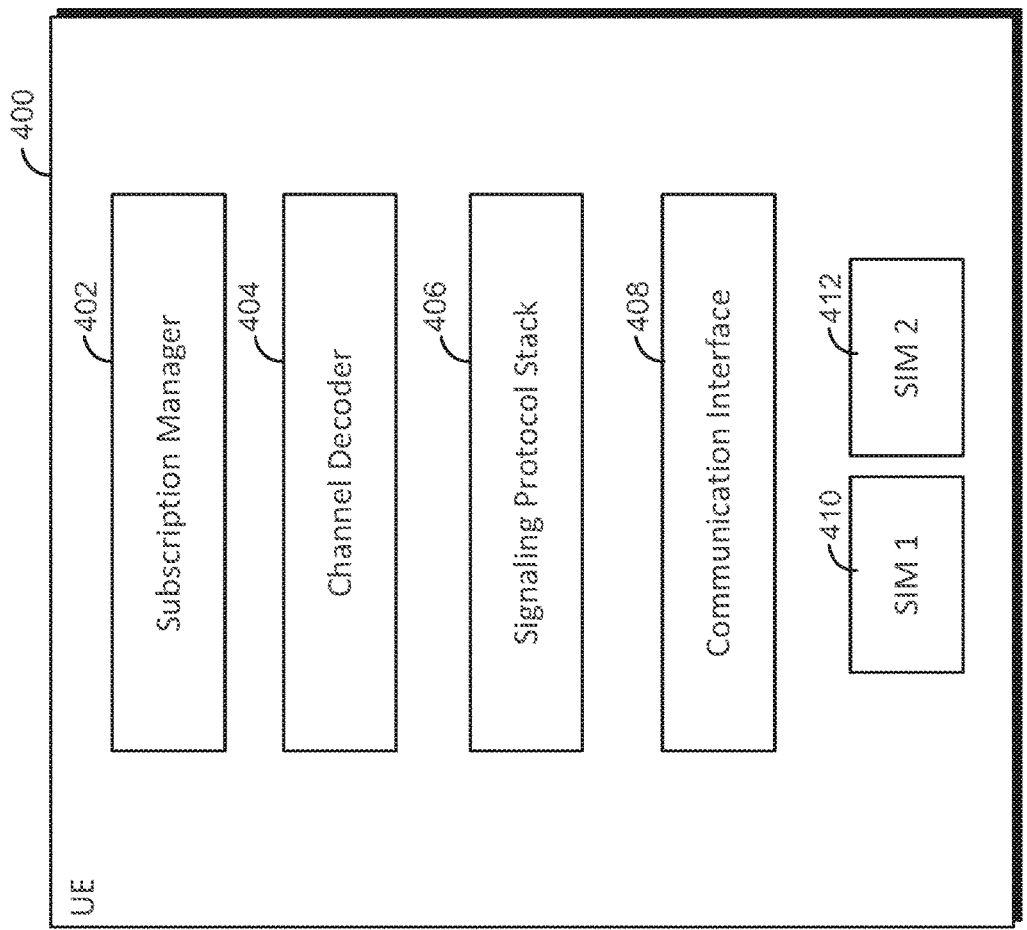
FIG. 4 is a conceptual diagram illustrating a user equipment (UE) configured for multi-SIM/multi-standby operation according to some aspects of the present disclosure.

FIG. 4 is a conceptual diagram illustrating a user equipment (UE) 400 configured for multi-SIM/multi-standby operation according to some aspects of the present disclosure. In an aspect of the disclosure, the UE 400 may be any of the UEs illustrated in FIGS. 1a, 1b and/or 2, which may be configured to communicate with two or more subscriptions (e.g., a primary subscription and a secondary subscription of FIG. 6). The UE 400 has a subscription manager 402, a channel decoder 404, a signaling protocol stack 406, a communication interface 408, a first SIM (SIM1) 410 and a second SIM (SIM 2) 412. Alternatively, a single SIM may be used. These components of FIG. 4 may be implemented in software, hardware, firmware, or a combination thereof. The subscription manager 402 manages the subscriptions that the UE 400 may communicate with under various conditions. For example, the UE 400 may operate with a primary subscription and a secondary subscription in a DSDS operation. The channel decoder 404 may decode various channels from the primary subscription or secondary subscription. For example, the channel decoder 404 may decode a downlink Dedicated Physical Channel (DPCH) that carries signaling messages from the network. The signaling protocol stack 406 may be the same as the signaling protocol stack shown in FIG. 3 and adapted to support communication with more than one subscriptions. Alternatively, UE 400 may have a single subscription and a single SIM.

The communication interface 408 provides a means for communicating with various other apparatus over a transmission medium. In an aspect of the disclosure, the UE 400 includes two SIMs 410 and 412, associated with different subscriptions or networks. The UE 400 may use the communication interface 408 to access the different subscriptions associated with the SIMs 410 and 412. In some aspects of the disclosure, the communication interface 408 may include a transceiver that is time-shared by the subscriptions. Alternatively, the communication interface 408 may include two transceivers that may individually access two subscriptions.

In various examples, the UE 400 may include a threshold manager 409 (not shown). The threshold manager 409 may be configured to perform threshold testing. In some aspects, the threshold manager 409 is embedded in one of the following components of the UE: the subscription manager 402, the channel decoder 404, the signaling protocol stack 406 or the communication interface 408. In other aspects, the threshold manager 409 is a component within the UE 400 and separate from the other components of the UE.

Figure 5:
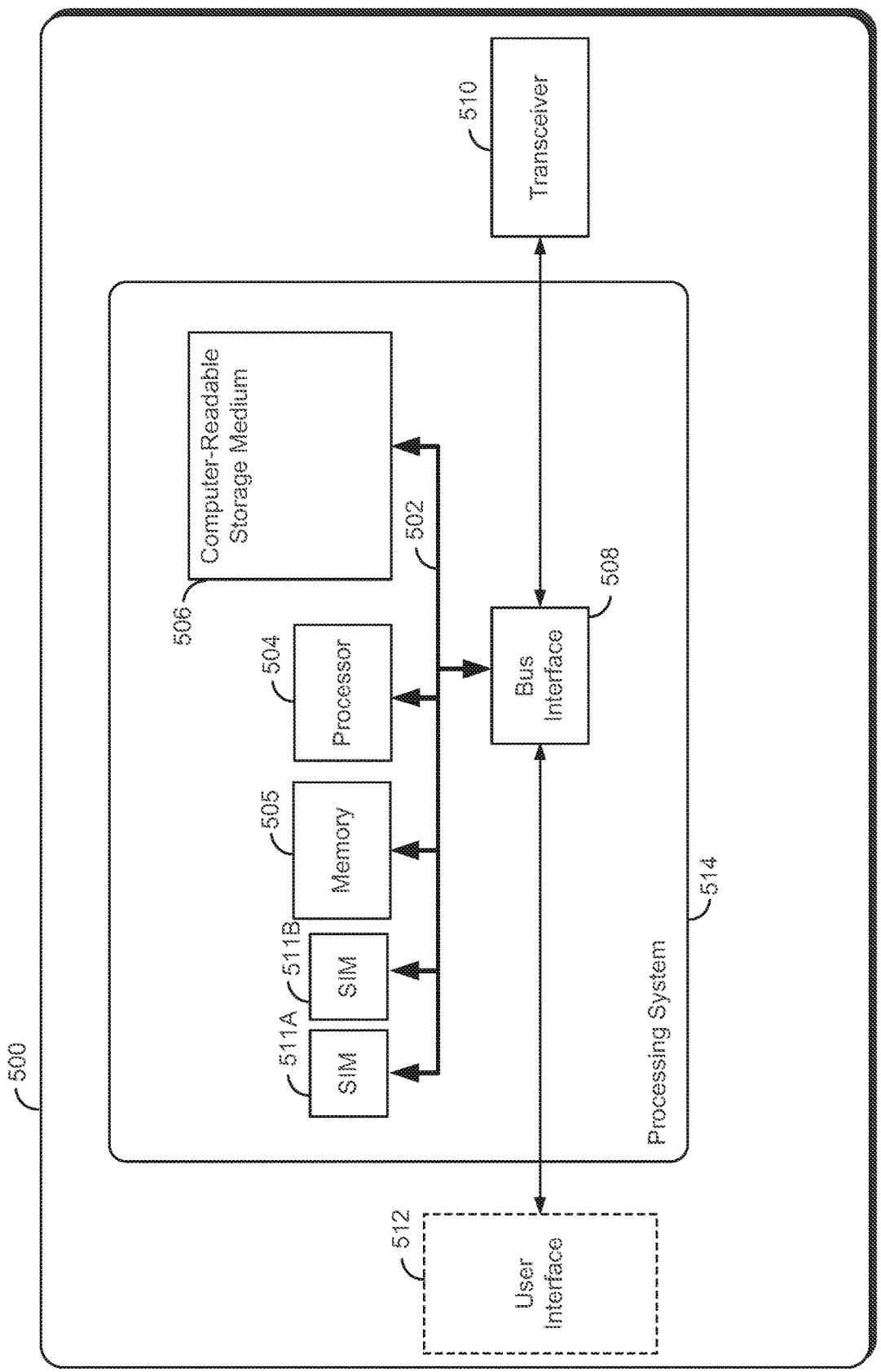
FIG. 5 is a block diagram illustrating an example of a hardware implementation for an apparatus employing a processing system according to some aspects of the present disclosure.

FIG. 5 is a block diagram illustrating an example of a hardware implementation for an apparatus 500 employing a processing system 514 according to some aspects of the present disclosure. In various examples, the apparatus 500 may be a user equipment. In accordance with various aspects of the disclosure, an element, or any portion of an element, or any combination of elements may be implemented with a processing system 514 that includes one or more processors 504. For example, any of the UEs in FIGS. 1a, 1b, 2 or 4 may be implemented with the apparatus 500. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout the present disclosure. In various examples, the processor 504 may include a controller 507 (not shown). The controller 507 may be configured to set the receiver to diversity enabled mode or to diversity disabled mode. Although the controller 507 may be implemented within the processor 504, it may also be implemented as an external component to the processor 504.

In some aspects of the disclosure, blocks 402 to 408 of FIG. 4 may be implemented by the processor 504 and/or transceiver 510 of FIG. 5. Also, SIMs 410 and 412 may be the same as the SIM 511A and SIM 511B of FIG. 5. In some aspects of the disclosure, the radio protocol architecture of FIG. 3 or signaling protocol stack of 406 may be implemented by the processor 504 and/or memory 505 of FIG. 5.

In this example, the processing system 514 may be implemented with a bus architecture, represented generally by the bus 502. The bus 502 may include any number of interconnecting buses and bridges depending on the specific application of the processing system 514 and the overall design constraints. The bus 502 links together various circuits or components including one or more processors (represented generally by the processor 504), a memory 505, computer-readable media (represented generally by the computer-readable medium 506), and one or more SIMs 511A and 511B The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a means for communicating with various other apparatus over a transmission medium. The transceiver 510 may be used to access one or more subscriptions respectively associated with the SIMs 511A and 511B.

In some examples of a UE device such as the illustrated UE 110 or UE 400 including two SIMs, even though the SIMs may be utilized by different subscriptions or networks, the subscriptions may share a RF resource such as a single transceiver 510. Alternatively, the subscriptions may have dedicated RF resources such as two transceivers 510.

Depending upon the nature of the apparatus, a user interface 512 (e.g., keypad, display, speaker, microphone, joystick, a touchscreen, a touchpad) may also be provided. The processor 504 is responsible for managing the bus 502 and general processing, including the execution of software stored on the computer-readable medium 506. The software when executed by the processor 504, causes the processing system 514 to perform the various functionalities described in relation to FIGS. 6-9 for any particular apparatus. The computer-readable medium 506 may also be used for storing data that is manipulated by the processor 504 when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In various aspects of the disclosure, a UE may simultaneously or concurrently perform two different communication activities, including but not limited to connecting with two different networks, or two different subscriptions within the same network, or two cells in a cellular network. Particularly, the UE may be enabled to continue to be engaged in ongoing communication activities on one subscription, while simultaneously or concurrently performing other communication activities on another subscription, such as receiving paging messages, traffic signal, performing SMS messaging, or receiving other information on a different subscription or from a different cell.

Figure 6:
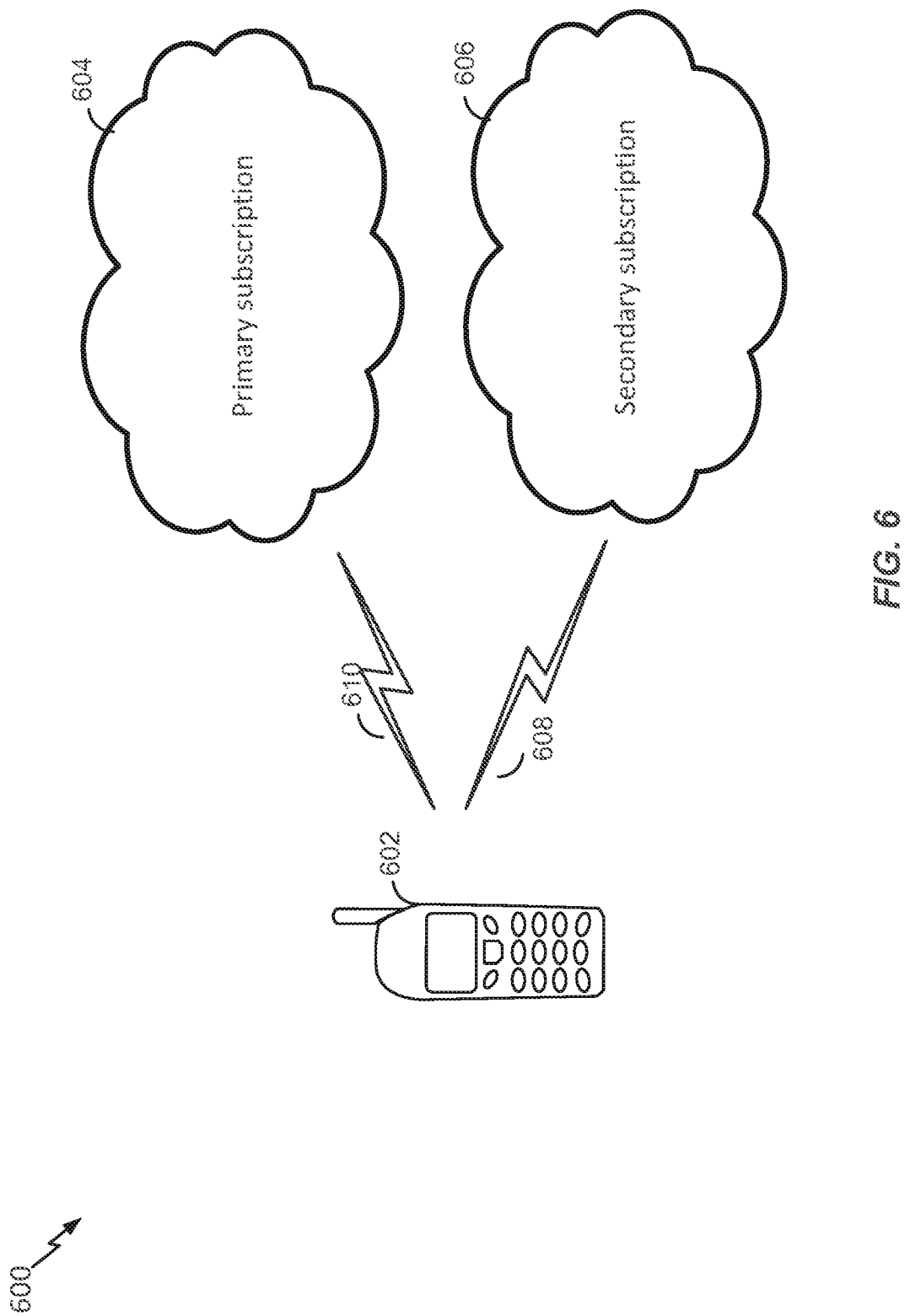
FIG. 6 is a conceptual diagram illustrating a user equipment configured to operate in a primary subscription and a secondary subscription according to some aspects of the present disclosure.

FIG. 6 is a conceptual diagram 600 illustrating a user equipment (UE) 602 configured to operate in a primary subscription 604 and a secondary subscription 606 according to some aspects of the present disclosure. In an example, the UE 602 may be any of the UEs illustrated in FIGS. 1a, 1b, 2, and 4, which may be implemented by the apparatus 500. In one aspect of the disclosure, the UE 602 may include a subscription manager 402 of FIG. 4 to manage multiple subscriptions. The UE 602 may also have two receive chains capable of achieving receive diversity with two propagation paths, a first path 610 and a second path 608. Alternatively, the UE 602 may have a single subscription with a single SIM.

In a wireless communication system, communication performance is a function of many factors. One important factor is the link condition of the channel. The channel is the propagation path between the transmitter and receiver. The link condition is the propagation state of the channel. That is, the propagation state of the channel is the loss of the channel as well as the amplitude and phase distortion in the channel. In general, the link condition is time varying such that communication performance is also time varying.

In an ideal channel, there is no distortion in amplitude or phase introduced by the channel and the only loss is due to intrinsic free space loss (i.e., intrinsic free space loss is propagation loss due solely to the link geometry between the transmitter and receiver with no losses due to the propagation medium itself). In this case, the link condition is ideal since the receive power level will be at its maximum possible level. In an actual channel, amplitude and phase distortion in the channel may occur and there may be other losses in the channel beyond intrinsic free space loss. In this case, the link condition may be degraded. Thus, the receiver may be designed taking into account the link conditions of the actual channel to obtain the best communication performance.

One example of an actual channel is a fading channel. In the fading channel, the receive signal experiences a power reduction or fade over a time period. A fade degrades the communication performance, for example, the channel chip energy to noise density ratio $E_c/N_0$, the channel chip energy to interference density ratio $E_c/I_0$, the carrier to noise ratio $C/N_0$, the bit error rate (BER), etc. For example, a fade may be divided into two types: slow fade and fast fade. A slow fade typically implies that a coherence time of the channel is much greater than an allowable delay spread in the receive signal. A fast fade typically implies that the coherence time of the channel is much less than the allowable delay spread in the receive signal. For example, the coherence time may be approximated by the time duration for which the propagation state of the channel is essentially constant. For example, the allowable delay spread of a signal is the allowable time extent of multiple copies of the same signal.

One mitigation strategy against a fading channel is receive diversity. For example, receive diversity refers to the capability of a mobile device or any wireless device to receive and process more than one receive signal which contain the same receive waveform. Receive diversity may improve communication performance in fading channel conditions.

In several examples, a mobile device (i.e., a user equipment) may allow receive diversity. The mobile device may include a plurality of receive chains, where each receive chain independently receives a receive signal. Each of the plurality of receive chains may include an antenna. In various examples, high order (i.e., greater than two antennas) receive diversity may be implemented.

Receive diversity is a receiver configuration that may be enabled or disabled, depending on link conditions of the channel. For example, receive diversity may be disabled when the link conditions result in good communication performance, i.e., the link is nominal. Alternatively, receive diversity may be enabled when link conditions result in poor communication performance, i.e., the link is degraded. Since receive diversity consumes more system resources, e.g., bandwidth, transmit power, etc., receive diversity may be enabled only when necessary.

In various aspects, a receiver may detect a fade and implement a fade mitigation strategy to maintain communication performance in the presence of a fade. The fade mitigation strategy may be to enable or disable receive diversity based on a threshold test. A threshold test may be a comparison of a power measurement against a threshold. For example, if the power measurement is equal to or above the threshold, then receive diversity may be disabled. For example, if the power measurement is less than the threshold, then receive diversity may be enabled.

In various examples, a receiver may compare a receive power measurement against a power threshold $T_p$, and decide whether or not to enable receive diversity. Alternately, the receiver may compare a channel chip energy to interference density ratio $E_c/I_0$, against a first channel chip energy to interference density threshold $T_1$ and decide whether or not to enable receive diversity. Or, the receiver may compare a filtered channel chip energy to interference density ratio $<E_c/I_0>$, against a second channel chip energy to interference density threshold $T_2$ and decide whether or not to enable receive diversity. For example, a filtered channel chip energy to interference density ratio may be computed by a simple average of a plurality of channel chip energy to interference density ratio values. Other parameters related to receive power may be used such as carrier-to-noise density ratio may be compared against a threshold.

However, in some propagation scenarios, the above threshold tests may not be robust and may result in degraded communication performance. For example, if the propagation scenario is a fast fade, the filtered channel chip enemy to interference density ratio may be above the second channel chip energy to interference density threshold $T_2$ and the receiver may disable receive diversity. However, in a fast fade, it may be desirable to enable receive diversity to maintain communication performance. In such propagation scenarios, a pseudo level crossing rate (PLCR) test may be employed as a fade detection and mitigation strategy to improve communication performance in the presence of a fast fade.

The PLCR test may employ a plurality of thresholds to decide whether to enable or disable receive diversity. For example, the receiver may make sequential power measurements of the receive signal in a sequential manner. That is, a $N^{th}$ power measurement may be obtained during time interval $T_N$ and a $(N+1)^{th}$ power measurement may be obtained during time interval $T_{N+1}$, where $T_{N+1}$ follows $T_N$. A receive power measurement during time interval $T_N$ may be used to enable or disable receive diversity during time interval $T_{N+1}$. For example, each time interval may represent a wakeup interval, i.e., when the receiver is active (not idle). That is, a receive power measurement during a $N^{th}$ wakeup interval may be used to enable or disable receive diversity during a $(N+1)^{th}$ wakeup interval.

In various examples, the PLCR test may combine a pseudo level crossing rate (PLCR) algorithm and an existing filtered channel chip energy to interference density ratio algorithm to yield improved detection of fades in either a fast or slow fading channel. As a result, the PLCR test may result in improved receive signal demodulation performance by proper selection of enabling and disabling of receive diversity. For example, the receive signal may be a paging signal or a traffic signal.

In various examples, the PLCR algorithm may calculate the rate where the receive power level or filtered channel chip energy to interference density ratio $<E_c/I_0>$, is below a predefined level within a time interval or window. The rate may provide an upper bound of a true level cross rate. The rate may work well under both fast fading and slow fading conditions to identify channel quality or link condition.

In various examples, the PLCR test may use several thresholds to switch between a receive diversity enabled state and a receive diversity disabled state. A first threshold, denoted as "$E_c I_0\_LCR\_thrshld$", may be applied to a power measurement during a current time interval $T_N$ to determine whether to enable or disable receive diversity for a next time interval $T_{N+1}$. A second threshold, denoted as "LCR_thrshld_ toRxD", may be defined as M/S, where M is defined as a number of $E_c/I_0$ samples below $E_c I_0\_LCR\_thrshld$ out of S $E_c/I_0$ samples. S is the total number of $E_c/I_0$ samples in the current time interval $T_N$. A third threshold, denoted as "LCR_thrshld_toNonRxD", may be defined as N/S, where N is defined as a number of $E_c/I_0$ samples above $E_c I_0\_LCR\_thrshld$ out of S $E_c/I_0$ samples.

In various examples, if there are K $E_c/I_0$ samples out of S $E_c/I_0$ samples which are below $E_c I_0\_LCR\_thrshld$ during a current time interval $T_N$, then if K is greater than or equal to M, enable receive diversity in a next time interval $T_{N+1}$. In various examples, if there are L $E_c/I_0$ samples out of S $E_c/I_0$ samples which are above $E_c I_0\_LCR\_thrshld$ during a current time interval $T_N$, then if L is less than N, disable receive diversity in a next time interval $T_{N+1}$.

If the receiver is in a receive diversity enabled state, the filtered channel chip energy to interference density ratio may be calculated for each receive chain and the number of $E_c/I_0$ samples below $E_c I_0\_LCR\_thrshld$ may be computed for each receive chain. For example, the receiver may have a first receive chain and a second receive chain. Given the power measurements from each receive chain, the receiver may determine: (1) whether to switch to receive diversity disabled state and (2) which receive chain to disable. For example, if both receive chains satisfy the filtered channel chip energy to interference density ratio threshold condition and the measured $E_c/I_0$ samples are less than LCR_thrshld_ toNonRxD, then disable receive diversity in a next time interval $T_{N+1}$. In addition, the first receive chain may be selected to be disabled.

In various aspects, the PLCR test may be summarized as follows:
In a current time interval, start in receive diversity disabled state. If either of the following conditions are satisfied:
  filtered channel chip energy to interference density ratio $<E_c I_0$ threshold, or
  measured number of $E_c/I_0$ samples below $E_c I_0\_LCR\_thrshld \geq LCR\_thrshld\_toRxD$ (i.e., out of S consecutive input samples, the measured number of Ec/Io samples counted to be below $E_c I_0\_LCR\_thrshld$ is more than or equal to M),
then enable receive diversity in a next time interval.
In a current time interval, start in receive diversity enabled state. If both of the following conditions are satisfied:
  filtered channel chip energy to interference density ratio$\geq E_c I_0$ threshold, and,
  measured number of $E_c/I_0$ samples below $E_c I_0\_LCR\_thrshld < LCR\_thrshld\_toNonRxD$, (i.e., out of S consecutive input samples, the measured number of $E_c/I_0$ samples counted to be below $E_c I_0\_LCR\_thrshld$ is less than N),
then disable receive diversity in a next time interval.

Figure 7:
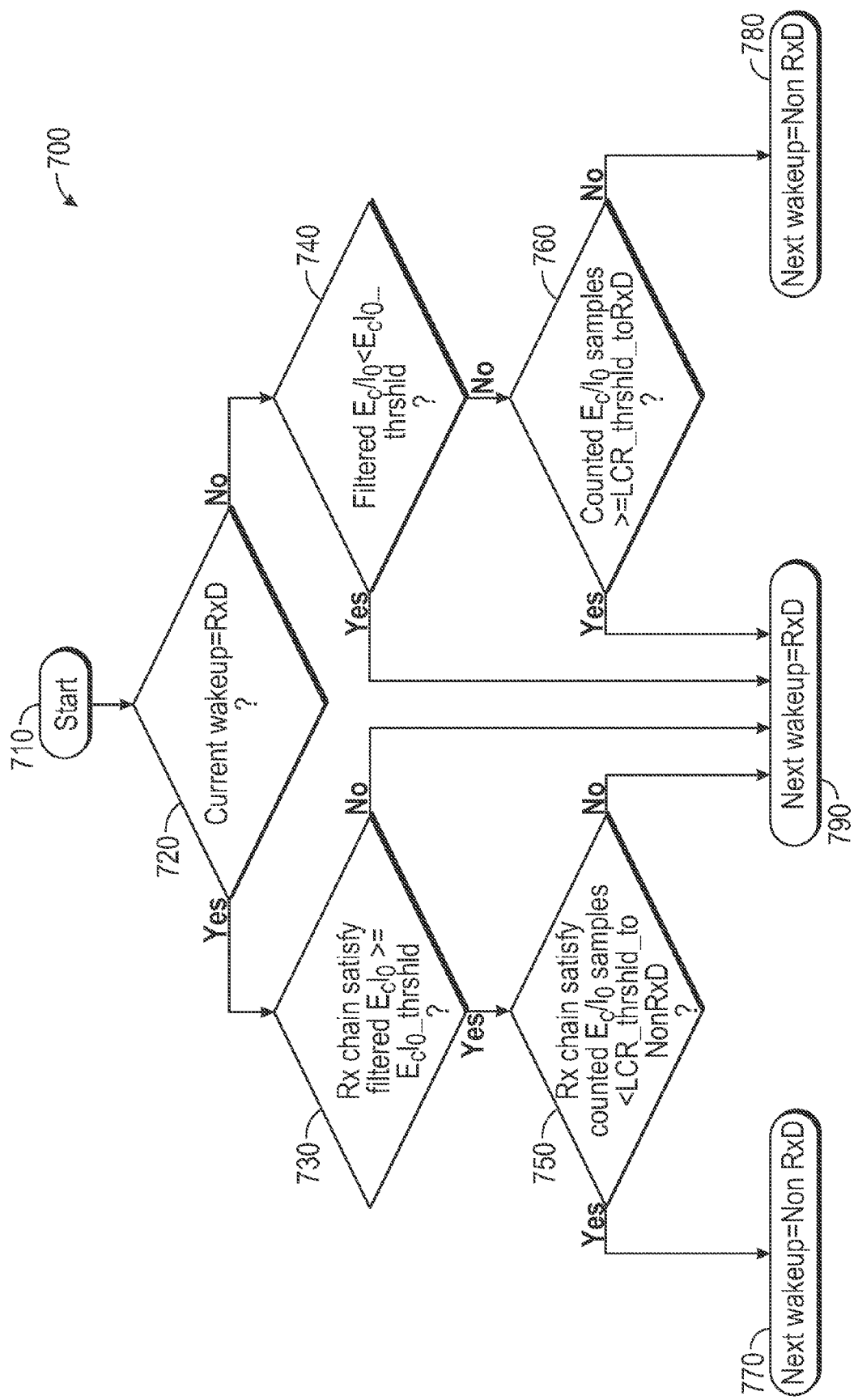
FIG. 7 is a diagram illustrating an example of a pseudo level crossing rate (PLCR) test algorithm according to some aspects of the present disclosure.

FIG. 7 is a diagram illustrating an example of a pseudo level crossing rate (PLCR) test algorithm 700 according to some aspects of the present disclosure. In block 710, start the algorithm. In block 720, determine if a UE is in a receive diversity enabled (RxD) state at a current time interval (i.e., current wakeup). If yes, proceed to block 730. If no, proceed to block 740. If no, only one receive chain is active.

In block 730, compare a first receive chain filtered channel chip energy to interference density ratio ($E_c/I_0$) to an interference density ratio threshold ($E_c I_0$ threshold), and compare a second receive chain filtered channel chip energy to interference density ratio ($E_c/I_0$) to the $E_c I_0$ threshold, wherein the first and second receive chain filtered channel chip energy to interference density ratios are based on at least two power measurements obtained in the receive diversity enabled (RxD) state. If both comparisons are greater than or equal to the $E_c I_0$ threshold (i.e., Rx chains satisfy filtered $E_c/I_0 >= E_c I_0$ threshold), proceed to block 750. If one comparison or both comparisons are less than the $E_c I_0$ threshold (i.e., at least one Rx chain does NOT satisfy filtered $E_c/I_0 >= E_c I_0$ threshold), proceed to block 790. Hence, if either the first or the second, or both the first and the second receive chain filtered channel chip energy to interference density ratio is less than the $E_c I_0$ threshold, proceed to block 790. The comparison in block 730 applies for a diversity case where two Rx chains are active.

In block 750, compare a first receive chain measured number of $E_c/I_0$ samples below $E_c I_0\_LCR\_thrshld$ to a non-receive diversity threshold, LCR_thrshld_toNonRxD, and compare a second receive chain measured number of $E_c/I_0$ samples to the non-receive diversity threshold, LCR_thrshld_toNonRxD. In various examples, the first receive chain measured number of $E_c/I_0$ samples is based on the first receive chain filtered channel chip energy to interference density ratio. In various examples, the second receive chain measured number of $E_c/I_0$ samples is based on the second receive chain filtered channel chip energy to interference density ratio.

If both comparisons are less than the non-receive diversity threshold, LCR_thrshld_toNonRxD (i.e., Rx chains satisfy counted $E_c/I_0$ samples<LCR_thrshld_toNonRxD) proceed to block 770. In block 770, set the receiver to a receive diversity disabled state in a next time interval, wherein the next time interval follows the current time interval. If one comparison or both comparisons are greater than or equal to the non-receive diversity threshold, LCR_thrshld_toNonRxD (i.e., at least one Rx chain does not satisfy counted $E_c/I_0$ samples <LCR_thrshld_toNonRxD), proceed to block 790. Hence, if either the first or the second, or both the first and the second receive chain measured number of $E_c/I_0$ samples is greater than or equal to the non-receive diversity threshold, LCR_thrshld_toNonRxD, proceed to block 790.

In block 740, compare the receive chain filtered channel chip energy to interference density ratio ($E_c/I_0$) to the $E_c I_0$ threshold. If the receive chain filtered channel chip energy to interference density ratio ($E_c/I_0$) is less than the $E_c I_0$ threshold (i.e., filtered $E_c/I_0 < E_c I_0$ threshold), then proceed to block 790. If the receive chain filtered channel chip energy to interference density ratio ($E_c/I_0$) is greater than or equal to the $E_c I_0$ threshold (i.e., filtered $E_c/I_0 >= E_c I_0$ threshold), proceed to block 760. The comparison in block 740 applies for a non-diversity case where only one Rx chain is active.

In block 760, compare the receive chain measured number of $E_c/I_0$ samples to a receive diversity threshold LCR_thrshld_toRxD. If the measured number of $E_c/I_0$ samples below $E_c I_0$ LCR_thrshld is greater than or equal to the receive diversity threshold LCR_thrshld_toRxD (i.e., counted $E_c/I_0$ samples >=LCR_thrshld_toRxD), proceed to block 790. If the receive chain measured number of $E_c/I_0$ samples below $E_c I_0$ LCR_thrshld is less than the receive diversity threshold LCR_thrshld_toRxD (i.e., counted $E_c/I_0$ samples<LCR_thrshld_toRxD), proceed to block 780.

In block 780, set the receiver to a receive diversity disabled state in a next time interval, wherein the next time interval follows the current time interval. In various examples, the receiver is within the UE. In block 790, set the receiver to a receive diversity enabled state in a next time interval, wherein the next time interval follows the current time interval. In various examples, when the receiver is set to the receive diversity enabled state, trigger hybrid fallback.

Figure 8:
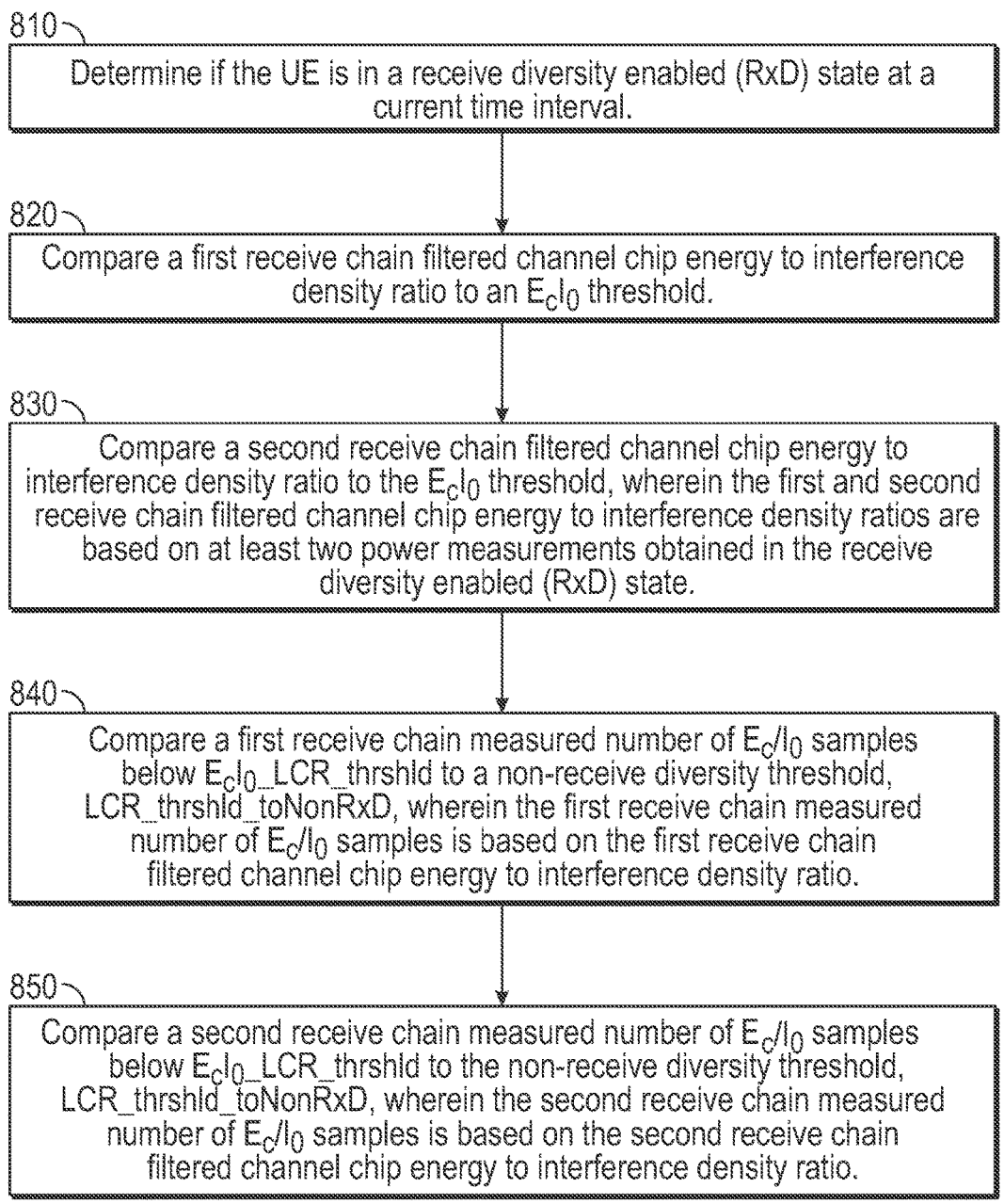
FIG. 8 is a flow diagram illustrating a first example for enabling or disabling receive diversity.

FIG. 8 is a flow diagram illustrating a first example for enabling or disabling receive diversity. In block 810, determine if the UE is in a receive diversity enabled (RxD) state at a current time interval. In various examples, the determination may be performed by the controller 507 (as illustrated in FIG. 5).

In block 820, compare a first receive chain filtered channel chip energy to interference density ratio to an $E_c I_0$ threshold. In various examples, the comparison may be performed by the channel decoder 404 (as illustrated in FIG. 4).

In block 830, compare a second receive chain filtered channel chip energy to interference density ratio to the $E_c I_0$ threshold, wherein the first and second receive chain filtered channel chip energy to interference density ratios are based on at least two power measurements obtained in the receive diversity enabled (RxD) state. In various examples, the comparison may be performed by the channel decoder 404 (as illustrated in FIG. 4).

In block 840, compare a first receive chain measured number of $E_c/I_0$ samples below $E_c I_0$ LCR_thrshld to a non-receive diversity threshold, LCR_thrshld_toNonRxD, wherein the first receive chain measured number of $E_c/I_0$ samples is based on the first receive chain filtered channel chip energy to interference density ratio. In various examples, the comparison may be performed by the controller 507 (as illustrated in FIG. 5).

In block 850, compare a second receive chain measured number of $E_c/I_0$ samples below $E_c I_0$ LCR_thrshld to the non-receive diversity threshold, LCR_thrshld_toNonRxD, wherein the second receive chain measured number of $E_c/I_0$ samples is based on the second receive chain filtered channel chip energy to interference density ratio. In various examples, the comparison may be performed by the controller 507 (as illustrated in FIG. 5).

In various aspects, if either the first or the second, or both the first and the second receive chain filtered channel chip energy to interference density ratio is less than the $E_c I_0$ threshold; or if either the first or the second, or both the first and the second receive chain measured number of $E_c/I_0$ samples is greater than or equal to the non-receive diversity threshold, LCR_thrshld_toNonRxD, then set a receiver in the UE to a receive diversity enabled state in a next time interval, wherein the next time interval follows the current time interval. In various examples, the comparison may be performed by the controller 507 (as illustrated in FIG. 5).

In various aspects, if the first and the second receive chain filtered channel chip energy to interference density ratio is greater than or equal to the $E_c I_0$ threshold, and if the first and the second receive chain measured number of $E_c/I_0$ samples is less than the non-receive diversity threshold, LCR_thrshld_toNonRxD, then set a receiver in the UE to a receive diversity disabled state in a next time interval, wherein the next time interval follows the current time interval. In various examples, the comparison may be performed by the controller 507 (as illustrated in FIG. 5).

Figure 9:
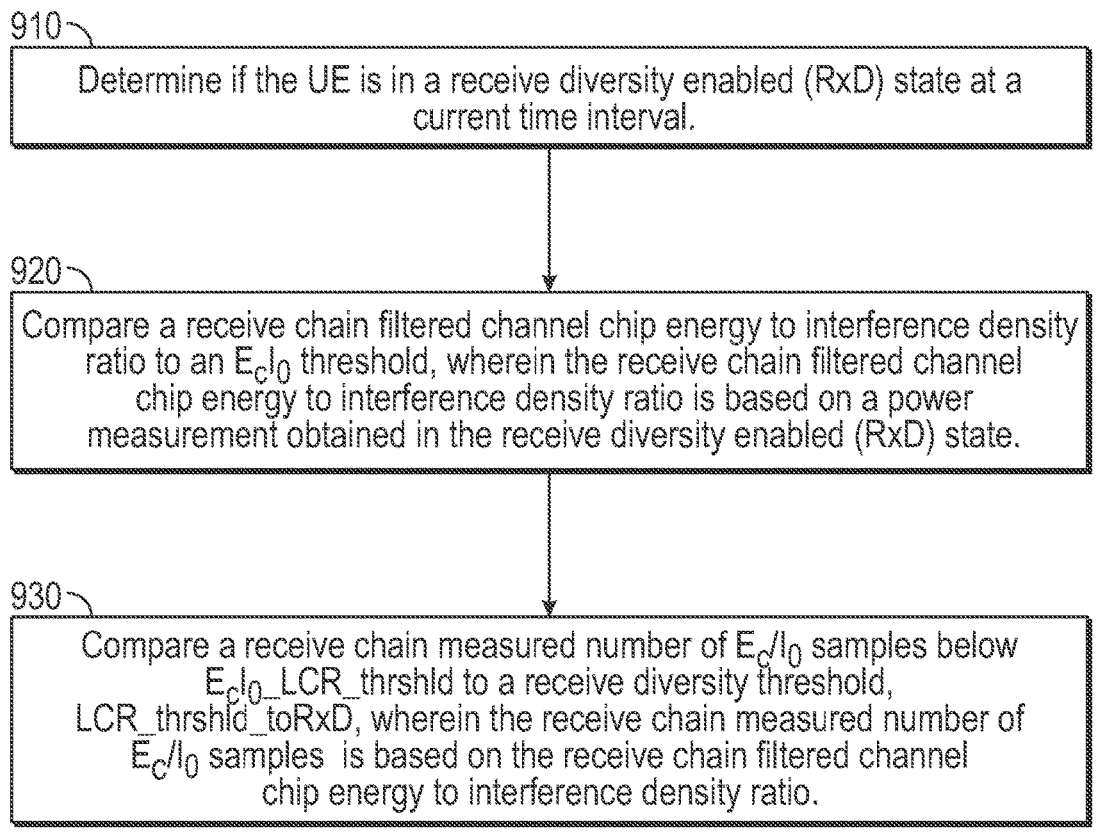
FIG. 9 is a flow diagram illustrating a second example for enabling or disabling receive diversity.

FIG. 9 is a flow diagram illustrating a second example for enabling or disabling receive diversity. In block 910, determine if the UE is in a receive diversity enabled (RxD) state at a current time interval. In various examples, the determination may be performed by the controller 507 (as illustrated in FIG. 5).

In block 920, compare a receive chain filtered channel chip energy to interference density ratio to an $E_c I_0$ threshold, wherein the receive chain filtered channel chip energy to interference density ratio is based on a power measurement obtained in the receive diversity enabled (RxD) state. In various examples, the comparison may be performed by the channel decoder 404 (as illustrated in FIG. 4).

In block 930, compare a receive chain measured number of $E_c/I_0$ samples below $E_c I_0$ LCR_thrshld to a receive diversity threshold, LCR_thrshld_toRxD, wherein the receive chain measured number of $E_c/I_0$ samples is based on the receive chain filtered channel chip energy to interference density ratio. In various examples, the comparison may be performed by the controller 507 (as illustrated in FIG. 5).

In various aspects, if the receive chain filtered channel chip energy to interference density ratio is less than the $E_c I_0$ threshold, or if the receive chain measured number of $E_c/I_0$ samples below $E_c I_0$ LCR_thrshld is greater than or equal to the receive diversity threshold, LCR_thrshld_toRxD, then set a receiver in the UE to a receive diversity enabled state in a next time interval, wherein the next time interval follows the current time interval. In various examples, the setting may be performed by the controller 507 (as illustrated in FIG. 5).

In various aspects, if the receive chain filtered channel chip energy to interference density ratio is greater than or equal to the $E_c I_0$ threshold, and if the receive chain measured number of $E_c/I_0$ samples below $E_c I_0$ LCR_thrshld is less than the receive diversity threshold, LCR_thrshld_toRxD, then set a receiver in the UE to a receive diversity disabled state in a next time interval, wherein the next time interval follows the current time interval. In various examples, the comparison may be performed by the controller 507 (as illustrated in FIG. 5).

In various examples, the pseudo level crossing rate (PLCR) test may well track fades in a fast fading channel.

As a result, the PLCR test may enhance demodulation performance for a receive signal, e.g., a paging signal, by enabling receive diversity when the link is degraded. In addition, the PLCR test may avoid enabling receive diversity when the link is nominal.

Table 1 shows that the PLCR test may improve cdma2000 1× paging signal demodulation success rate by 5% to 20% under different link conditions. For example, in multimode L+1× (i.e., LTE plus cdma2000 1×) DR-DSDS scenario, the majority of enabling receive diversity operations may be triggered by the PLCR test.

TABLE 1

|  | Without PLCR | With PLCR | Gains on Mav13 | % of 1x RxD over total wakeup | % of RxD triggered due to PLCR over total wakeup |
|---|---|---|---|---|---|
| 1x MT Demod Performance, 1x BC0, Poor Geometry 1x Ec/Io - 10 dB; Fading - VehA 70 kmph; 4 PN scenario LTE B13, LTE traffic. | 70 | 87 | 20% | 39% | 23% |
| 1x MT Demod Performance, 1x BC0, Poor Geometry 1x Ec/Io - 12 dB; Fading - VehA 70 kmph; 4 PN scenario LTE B13, LTE traffic. | 63 | 80 | 21% | 83% | 72% |
| 1x MT Demod Performance, 1x BC0, Poor Geometry 1x Ec/Io - 14 dB; Fading - VehA 70 kmph; 4 PN scenario LTE B13, LTE traffic. | 74 | 79 | 6% | 90% | 52% |

Figure 10:
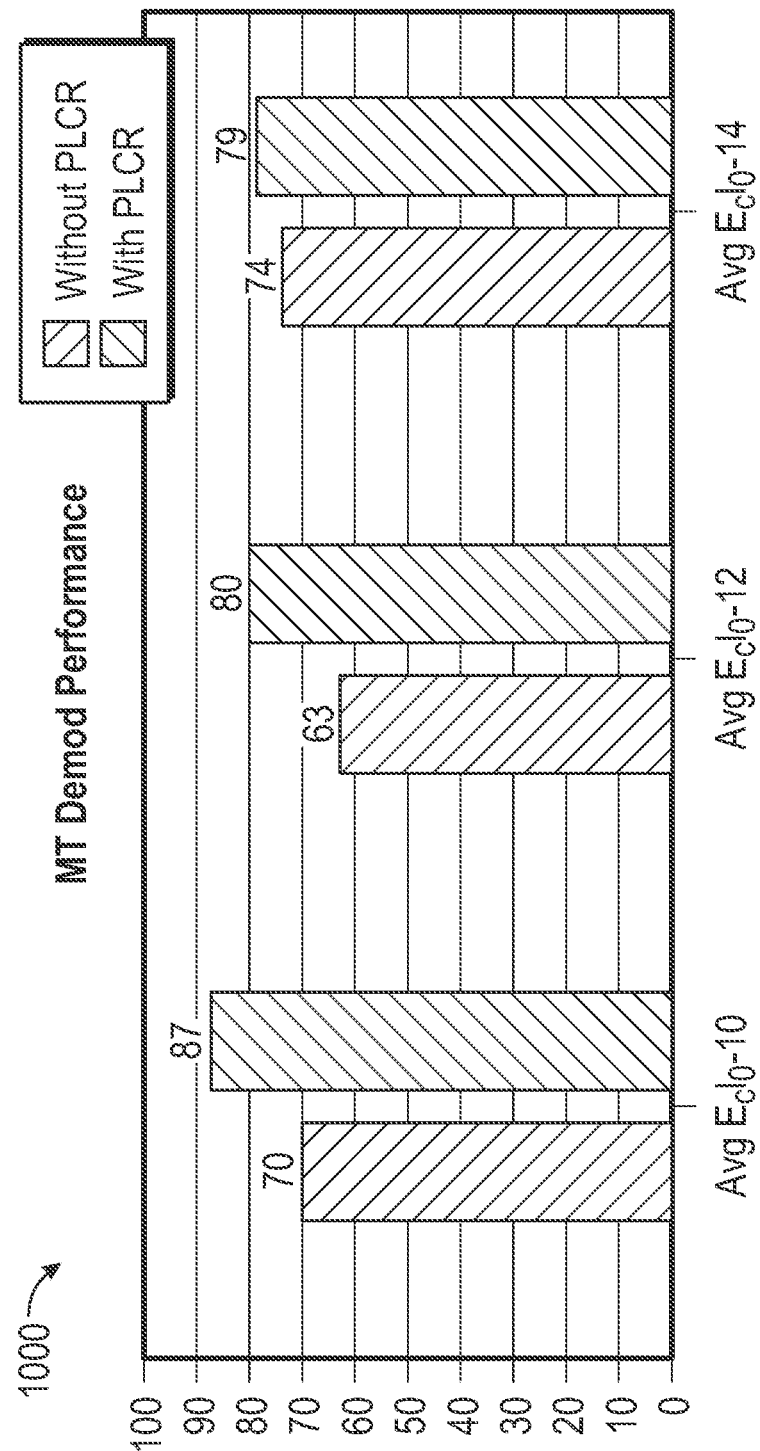
FIG. 10 illustrates an example of a 1× mobile device paging demodulation performance with and without a pseudo level crossing rate (PLCR) test.

FIG. 10 illustrates an example of a 1× mobile device paging demodulation performance 1000 with and without a pseudo level crossing rate (PLCR) test. In FIG. 10, performance metrics for three different interference operating points is shown.

Figure 11:
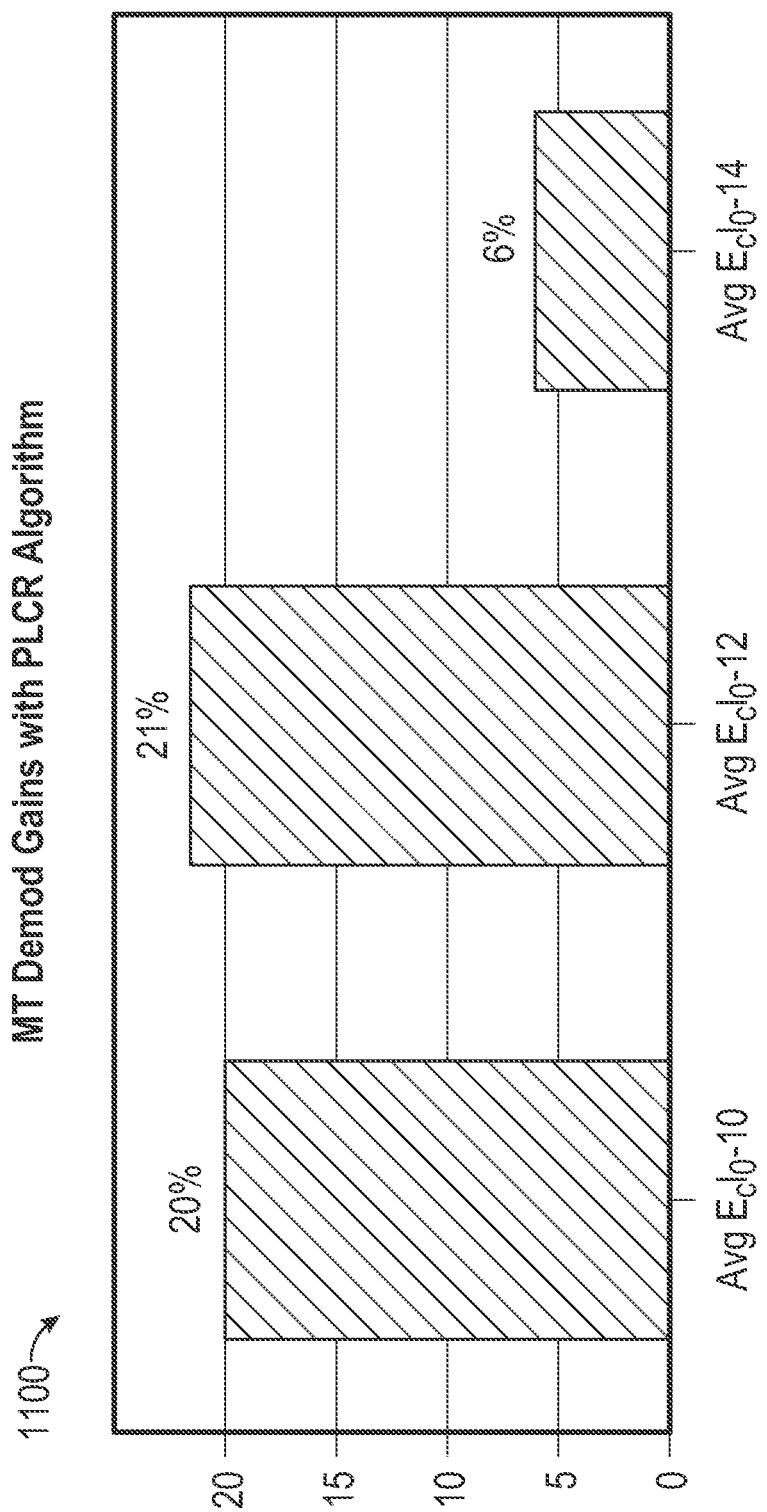
FIG. 11 illustrates an example of a 1× mobile device paging demodulation performance with a pseudo level crossing rate (PLCR) test.

FIG. 11 illustrates an example of a 1× mobile device paging demodulation performance 1100 with a pseudo level crossing rate (PLCR) test. In FIG. 11, performance gains for three different interference operating points is shown.

Several aspects of a telecommunications system have been presented with reference to a UMTS system. As those skilled in the art will readily appreciate, various aspects described throughout this disclosure may be extended to other telecommunication systems, network architectures and communication standards.

By way of example, various aspects may be extended to systems employing UMTS (FDD, TDD), WCDMA, TD-SCDMA, GSM, Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication operable at a user equipment (UE) configured for enabling or disabling receive diversity, comprising:
   determining if the UE is in a receive diversity enabled (RxD) state at a current time interval;
   comparing a first receive chain filtered channel chip energy to interference density ratio to an $E_cI_0$ threshold;
   comparing a second receive chain filtered channel chip energy to interference density ratio to the $E_cI_0$ threshold, wherein the first and second receive chain filtered channel chip energy to interference density ratios are based on at least two power measurements obtained in the receive diversity enabled (RxD) state;
comparing a first receive chain measured number of $E_c/I_0$ samples below $E_cI_0$_LCR_thrshld to a non-receive diversity threshold, LCR_thrshld_toNonRxD, wherein the first receive chain measured number of $E_c/I_0$ samples is based on the first receive chain filtered channel chip energy to interference density ratio; and
comparing a second receive chain measured number of $E_c/I_0$ samples below $E_cI_0$_LCR_thrshld to the non-receive diversity threshold, LCR_thrshld_toNonRxD, wherein the second receive chain measured number of $E_c/I_0$ samples is based on the second receive chain filtered channel chip energy to interference density ratio.

2. The method of claim 1, further comprising:
determining if either the first or the second, or both the first and the second receive chain filtered channel chip energy to interference density ratio is less than the $E_cI_0$ threshold; or determining if either the first or the second, or both the first and the second receive chain measured number of $E_c/I_0$ samples is greater than or equal to the non-receive diversity threshold, LCR_thrshld_toNonRxD; and
setting a receiver in the UE to a receive diversity enabled state in a next time interval, wherein the next time interval follows the current time interval.

3. The method of claim 1, further comprising:
determining that the first and the second receive chain filtered channel chip energy to interference density ratio is greater than or equal to the $E_cI_0$ threshold;
determining that the first and the second receive chain measured number of $E_c/I_0$ samples is less than the non-receive diversity threshold, LCR_thrshld_toNonRxD; and
setting a receiver in the UE to a receive diversity disabled state in a next time interval, wherein the next time interval follows the current time interval.

4. A method of wireless communication operable at a user equipment (UE) configured for enabling or disabling receive diversity, comprising:
determining if the UE is in a receive diversity enabled (RxD) state at a current time interval;
comparing a receive chain filtered channel chip energy to interference density ratio to an $E_cI_0$ threshold, wherein the receive chain filtered channel chip energy to interference density ratio is based on a power measurement obtained in the receive diversity enabled (RxD) state; and
comparing a receive chain measured number of $E_c/I_0$ samples below $E_cI_0$_LCR_thrshld to a receive diversity threshold, LCR_thrshld_toRxD, wherein the receive chain measured number of $E_c/I_0$ samples is based on the receive chain filtered channel chip energy to interference density ratio.

5. The method of claim 4, further comprising:
determining that the receive chain filtered channel chip energy to interference density ratio is less than the $E_cI_0$ threshold; or
determining that the receive chain measured number of $E_c/I_0$ samples below $E_cI_0$_LCR_thrshld is greater than or equal to the receive diversity threshold, LCR_thrshld_toRxD; and
setting a receiver in the UE to a receive diversity enabled state in a next time interval, wherein the next time interval follows the current time interval.

6. The method of claim 4, further comprising:
determining if the receive chain filtered channel chip energy to interference density ratio is greater than or equal to the $E_cI_0$ threshold;
determining if the receive chain measured number of $E_c/I_0$ samples below $E_cI_0$_LCR_thrshld is less than the receive diversity threshold, LCR_thrshld_toRxD and
setting a receiver in the UE to a receive diversity disabled state in a next time interval, wherein the next time interval follows the current time interval.

7. An apparatus for wireless communication operable at a user equipment (UE) configured for enabling or disabling receive diversity, comprising:
means for determining if the UE is in a receive diversity enabled (RxD) state at a current time interval;
means for comparing a first receive chain filtered channel chip energy to interference density ratio to an $E_cI_0$ threshold;
means for comparing a second receive chain filtered channel chip energy to interference density ratio to the $E_cI_0$ threshold, wherein the first and second receive chain filtered channel chip energy to interference density ratios are based on at least two power measurements obtained in the receive diversity enabled (RxD) state;
means for comparing a first receive chain measured number of $E_c/I_0$ samples below $E_cI_0$_LCR_thrshld to a non-receive diversity threshold, LCR_thrshld_toNonRxD, wherein the first receive chain measured number of $E_c/I_0$ samples is based on the first receive chain filtered channel chip energy to interference density ratio; and
means for comparing a second receive chain measured number of $E_c/I_0$ samples below $E_cI_0$_LCR_thrshld to the non-receive diversity threshold, LCR_thrshld_toNonRxD, wherein the second receive chain measured number of $E_c/I_0$ samples is based on the second receive chain filtered channel chip energy to interference density ratio.

8. The apparatus of claim 7, further comprising:
means for determining if either the first or the second, or both the first and the second receive chain filtered channel chip energy to interference density ratio is less than the $E_cI_0$ threshold; or determining if either the first or the second, or both the first and the second receive chain measured number of $E_c/I_0$ samples is greater than or equal to the non-receive diversity threshold, LCR_thrshld_toNonRxD; and
means for setting a receiver in the UE to a receive diversity enabled state in a next time interval, wherein the next time interval follows the current time interval.

9. The apparatus of claim 7, further comprising:
means for determining that the first and the second receive chain filtered channel chip energy to interference density ratio is greater than or equal to the $E_cI_0$ threshold;
means for determining that the first and the second receive chain measured number of $E_c/I_0$ samples is less than the non-receive diversity threshold, LCR_thrshld_toNonRxD; and
means for setting a receiver in the UE to a receive diversity disabled state in a next time interval, wherein the next time interval follows the current time interval.

10. An apparatus for wireless communication operable at a user equipment (UE) configured for enabling or disabling receive diversity, comprising:
means for determining if the UE is in a receive diversity enabled (RxD) state at a current time interval;

means for comparing a receive chain filtered channel chip energy to interference density ratio to an $E_c/I_0$ threshold, wherein the receive chain filtered channel chip energy to interference density ratio is based on a power measurement obtained in the receive diversity enabled (RxD) state; and means for comparing a receive chain measured number of $E_c/I_0$ samples below $E_cI_0\_LCR\_thrshld$ to a receive diversity threshold, LCR_thrshld_toRxD, wherein the receive chain measured number of $E_c/I_0$ samples is based on the receive chain filtered channel chip energy to interference density ratio.

11. The apparatus of claim 10, further comprising:

means for determining that the receive chain filtered channel chip energy to interference density ratio is less than the $E_cI_0$ threshold; or means for determining that the receive chain measured number of $E_c/I_0$ samples below $E_cI_0\_LCR\_thrshld$ is greater than or equal to the receive diversity threshold, LCR_thrshld_toRxD; and means for setting a receiver in the UE to a receive diversity enabled state in a next time interval, wherein the next time interval follows the current time interval.

12. The apparatus of claim 10, further comprising:

means for determining if the receive chain filtered channel chip energy to interference density ratio is greater than or equal to the $E_cI_0$ threshold;

means for determining if the receive chain measured number of $E_c/I_0$ samples below $E_cI_0\_LCR\_thrshld$ is less than the receive diversity threshold, LCR_thrshld_toRxD and means for setting a receiver in the UE to a receive diversity disabled state in a next time interval, wherein the next time interval follows the current time interval.

13. An apparatus for wireless communication operable at a user equipment (UE) configured for enabling or disabling receive diversity, comprising:

a controller configured for determining if the UE is in a receive diversity enabled (RxD) state at a current time interval; and a channel decoder configured for comparing a first receive chain filtered channel chip energy to interference density ratio to an $E_cI_0$ threshold, and for comparing a second receive chain filtered channel chip energy to interference density ratio to the $E_cI_0$ threshold, wherein the first and second receive chain filtered channel chip energy to interference density ratios are based on at least two power measurements obtained in the receive diversity enabled (RxD) state; and wherein the controller is further configured for comparing a first receive chain measured number of $E_c/I_0$ samples below $E_cI_0\_LCR\_thrshld$ to a non-receive diversity threshold, LCR_thrshld_toNonRxD, wherein the first receive chain measured number of $E_c/I_0$ samples is based on the first receive chain filtered channel chip energy to interference density ratio, and for comparing a second receive chain measured number of $E_c/I_0$ samples below $E_cI_0\_LCR\_thrshld$ to the non-receive diversity threshold, LCR_thrshld_toNonRxD, wherein the second receive chain measured number of $E_c/I_0$ samples is based on the second receive chain filtered channel chip energy to interference density ratio.

14. The apparatus of claim 13, wherein if either the first or the second, or both the first and the second receive chain filtered channel chip energy to interference density ratio is less than the $E_cI_0$ threshold; or if either the first or the second, or both the first and the second receive chain measured number of $E_c/I_0$ samples is greater than or equal to the non-receive diversity threshold, LCR_thrshld_toNonRxD, then the controller is further configured for setting a receiver in the UE to a receive diversity enabled state in a next time interval, wherein the next time interval follows the current time interval.

15. The apparatus of claim 13, wherein if the first and the second receive chain filtered channel chip energy to interference density ratio is greater than or equal to the $E_cI_0$ threshold and if the first and the second receive chain measured number of $E_c/I_0$ samples is less than the non-receive diversity threshold, LCR_thrshld_toNonRxD, then the controller is further configured for setting a receiver in the UE to a receive diversity disabled state in a next time interval, wherein the next time interval follows the current time interval.

16. An apparatus for wireless communication operable at a user equipment (UE) configured for enabling or disabling receive diversity, comprising:

a controller configured for determining if the UE is in a receive diversity enabled (RxD) state at a current time interval; and a channel decoder for comparing a receive chain filtered channel chip energy to interference density ratio to an $E_cI_0$ threshold, wherein the receive chain filtered channel chip energy to interference density ratio is based on a power measurement obtained in the receive diversity enabled (RxD) state; and wherein the controller is further configured for comparing a receive chain measured number of $E_c/I_0$ samples below $E_cI_0\_LCR\_thrshld$ to a receive diversity threshold, LCR_thrshld_toRxD, wherein the receive chain measured number of $E_c/I_0$ samples is based on the receive chain filtered channel chip energy to interference density ratio.

17. The apparatus of claim 16, wherein if the receive chain filtered channel chip energy to interference density ratio is less than the $E_cI_0$ threshold, or if the receive chain measured number of $E_c/I_0$ samples below $E_cI_0\_LCR\_thrshld$ is greater than or equal to the receive diversity threshold, LCR_thrshld_toRxD, then the controller is further configured for setting a receiver in the UE to a receive diversity enabled state in a next time interval, wherein the next time interval follows the current time interval.

18. The apparatus of claim 16, wherein if the receive chain filtered channel chip energy to interference density ratio is greater than or equal to the $E_cI_0$ threshold, and if the receive chain measured number of $E_c/I_0$ samples below $E_cI_0\_LCR\_thrshld$ is less than the receive diversity threshold, LCR_thrshld_toRxD, then the controller is further configured for setting a receiver in the UE to a receive diversity disabled state in a next time interval, wherein the next time interval follows the current time interval.

19. A non-transitory computer-readable storage medium storing computer executable code, operable on a device comprising at least one processor; a memory for storing a plurality of victim bands, the memory coupled to the at least one processor; and the computer executable code comprising:

instructions for causing the at least one processor to determine if the UE is in a receive diversity enabled (RxD) state at a current time interval;

instructions for causing the at least one processor to compare a first receive chain filtered channel chip energy to interference density ratio to an $E_cI_0$ threshold;

instructions for causing the at least one processor to compare a second receive chain filtered channel chip energy to interference density ratio to the $E_c/I_0$ threshold, wherein the first and second receive chain filtered channel chip energy to interference density ratios are based on at least two power measurements obtained in the receive diversity enabled (RxD) state;

instructions for causing the at least one processor to compare a first receive chain measured number of $E_c/I_0$ samples below $E_cI_0\_LCR\_thrshld$ to a non-receive diversity threshold, LCR_thrshld_toNonRxD, wherein the first receive chain measured number of $E_c/I_0$ samples is based on the first receive chain filtered channel chip energy to interference density ratio; and instructions for causing the at least one processor to compare a second receive chain measured number of $E_c/I_0$ samples below $E_cI_0\_LCR\_thrshld$ to the non-receive diversity threshold, LCR_thrshld_toNonRxD, wherein the second receive chain measured number of $E_c/I_0$ samples is based on the second receive chain filtered channel chip energy to interference density ratio.

20. A non-transitory computer-readable storage medium storing computer executable code, operable on a device comprising at least one processor; a memory for storing a plurality of victim bands, the memory coupled to the at least one processor; and the computer executable code comprising:

instructions for causing the at least one processor to determine if the UE is in a receive diversity enabled (RxD) state at a current time interval;

instructions for causing the at least one processor to compare a receive chain filtered channel chip energy to interference density ratio to an $E_c/I_0$ threshold, wherein the receive chain filtered channel chip energy to interference density ratio is based on a power measurement obtained in the receive diversity enabled (RxD) state; and instructions for causing the at least one processor to compare a receive chain measured number of $E_c/I_0$ samples below $E_cI_0\_LCR\_thrshld$ to a receive diversity threshold, LCR_thrshld_toRxD, wherein the receive chain measured number of $E_c/I_0$ samples is based on the receive chain filtered channel chip energy to interference density ratio.

* * * * *